United States Patent
Uchida et al.

Patent Number: 6,084,731
Date of Patent: *Jul. 4, 2000

[54] DISK-LIKE INFORMATION RECORDING MEDIUM, INFORMATION RECORDING/REPRODUCING APPARATUS, AND SYNCHRONIZING METHOD UTILIZING ROTATIONAL ANGLE

[75] Inventors: Masaki Uchida; Noriyuki Yamamoto; Nobuhiro Hayashi, all of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/997,281

[22] Filed: Dec. 23, 1997

[30] Foreign Application Priority Data

Dec. 26, 1996 [JP] Japan ..................................... 8-348575

[51] Int. Cl.$^7$ ....................................................... G11B 5/09
[52] U.S. Cl. ................................................ 360/48; 360/51
[58] Field of Search ................................. 360/48, 49, 51; 369/59

[56] References Cited

U.S. PATENT DOCUMENTS

| | | | |
|---|---|---|---|
| 4,630,145 | 12/1986 | Thompson et al. | 360/77 |
| 5,258,933 | 11/1993 | Johnson et al. | 364/602 |
| 5,383,065 | 1/1995 | Hayashi | 360/67 |
| 5,541,783 | 7/1996 | Yamamoto et al. | 360/48 |
| 5,600,501 | 2/1997 | Yamakoshi et al. | 360/51 |
| 5,786,954 | 7/1998 | Yada et al. | 360/51 |
| 5,796,534 | 8/1998 | Yamamoto et al. | 360/48 |
| 5,815,333 | 9/1998 | Yamamoto et al. | 360/60 |
| 5,828,509 | 10/1998 | Yada et al. | 360/51 |
| 5,828,510 | 10/1998 | Yada et al. | 360/51 |
| 5,894,463 | 4/1999 | Okawa et al. | 369/44.35 |

*Primary Examiner*—W. Chris Kim
*Attorney, Agent, or Firm*—Limbach & Limbach L.L.P.

[57] ABSTRACT

In an information recording/reproducing apparatus, frame synchronization is speedily performed when initialization is executed or the recording surfaces are switched, and the reliability of recorded data is improved. Segment IDs, each being formed by coding an information word representing a rotational angle measured from a rotational angle origin, are provided within the respective servo areas in such a manner that they are spaced equally in the track direction. While initial synchronization is performed, frame synchronization is established based on the information obtained by decoding the segment ID. This eliminates the need for detecting a home index pattern, thereby speedily performing the initial synchronizing operation. After initial synchronization is achieved, it is constantly monitored whether a frame is not out of synchronization based on the information obtained by decoding the segment ID. When it is detected that a frame is out of synchronization, a suitable operation is performed to minimize the destruction of recorded data.

8 Claims, 17 Drawing Sheets

| CODE 12 bits ||
|---|---|
| FRAME NUMBER (6 bits) | BIT-INVERTED FRAME NUMBER (6 bits) |

FRAME NUMBER

| 0 | 0 0 0 0 0 0 | 1 1 1 1 1 1 |
| 1 | 0 0 0 0 0 1 | 1 1 1 1 1 0 |
| ⋮ | ⋮ | ⋮ |
| 60 | 1 1 1 1 0 0 | 0 0 0 0 1 1 |
| ⋮ | ⋮ | ⋮ |

FIG. 9

| FRAME NUMBER | CODE | |
|---|---|---|
| | FRAME NUMBER (6 bits) | FRAME NUMBER (6 bits) |
| 0 | 0 0 0 0 0 0 | 0 0 0 0 0 0 |
| 1 | 0 0 0 0 0 1 | 0 0 0 0 0 1 |
| ⋮ | ⋮ | ⋮ |
| 60 | 1 1 1 1 0 0 | 1 1 1 1 0 0 |
| ⋮ | ⋮ | ⋮ |

| FRAME NUMBER | CODE 13 bits ||||
| | FRAME NUMBER (6 bits) | 1bit | FRAME NUMBER (6 bits) ||
| --- | --- | --- | --- | --- |
| 0 | 0 0 0 0 0 0 | 1 | 0 0 0 0 0 0 ||
| 1 | 0 0 0 0 0 1 | 0 | 0 0 0 0 0 1 ||
| ⋮ | ⋮ | ⋮ | ⋮ ||
| 60 | 1 1 1 1 0 0 | 1 | 1 1 1 1 0 0 ||
| ⋮ | ⋮ | ⋮ | ⋮ ||

| SECTOR | SKIP FLAG | LAST FLAG | COUNT |
|---|---|---|---|
| 1 | 0 | 0 | 0200 |
|   | 0 | 1 | 1FFF |
| 2 | 0 | 0 | 01A0 |
|   | 0 | 1 | 1FEE |
| 3 | 1 | 0 | 0111 |
|   | 1 | 1 | 1FFF |
| 4 | 0 | 0 | 000F |
|   | 0 | 0 | 1FFF |
|   | 0 | 1 | 1FFF |
| 5 | 0 | 0 | 00CD |
|   | 0 | 1 | 1FFF |
| ⋮ | ⋮ | ⋮ | ⋮ |

DISK-LIKE INFORMATION RECORDING MEDIUM, INFORMATION RECORDING/ REPRODUCING APPARATUS, AND SYNCHRONIZING METHOD UTILIZING ROTATIONAL ANGLE

BACKGROUND OF THE INVENTION

1. Field of the Invention

The present invention relates to a disk-like information recording medium and an information recording/ reproducing apparatus or an information reproducing apparatus using the disk-like information recording medium, such as a magnetic disk drive or a magneto-optical disk drive. The invention also relates to a method for establishing synchronization in the above information recording/ reproducing apparatus or in the above information recording apparatus.

2. Description of the Related Art

Hitherto, in compact magnetic disk drives or magneto-optical disk drives, servo areas and user data areas are alternately and independently formed on a recording surface of a disk-like information recording medium. On the servo area, servo information required for positioning recording/ reproducing means, such as a magnetic head or an optical pickup, is recorded. The methods for positioning recording/ reproducing means, for example, a magnetic head, based on the servo information, include a sector servo method and a synchronous servo method.

The sector servo method is employed when the individual servo information items are asynchronous with each other. In this method, a servo clock is generated based on a reference signal (preamble) recorded on each servo area, or is generated by means such as a PLL from a data string read from each servo information item.

In contrast, the synchronous servo method is used when the individual servo information items are synchronous with each other. In this method, a servo clock is generated from clock marks which have been formed by magnetic means or physical means in predetermined areas, for example, servo areas, discretely provided on a recording surface of a disk-like information recording medium.

A synchronous servo-type magnetic disk drive will be taken by way of example in order to explain the configuration of a servo area, the initial synchronizing method, the data format, and the recording/reproducing operation, all of which are used in a known technique.

A reference will first be made to the configuration of a conventional servo area. An example of a magnetic disk used in a conventional synchronous servo-type magnetic disk drive is shown in FIG. 16. Tracks are concentrically formed on a recording surface of a magnetic disk 200. Several hundreds of servo areas and data areas are alternately and independently provided on each track at an equal pitch. Moreover, since the servo areas and the data areas are radially located on the disk, they form a sector-like region having a predetermined center angle as viewed from the overall recording surface of the disk. A combination of a servo area and an adjacent data area is referred to as a "segment" in the track direction.

Several hundreds of servo areas provided on each track, as noted above, are each formed of an address region 202, a fine region 203, and a clock region 204. Accordingly, several hundreds of address regions 202, fine regions 203, and clock regions 204 are also provided on each track.

Most of the address regions 202 are each provided with an access pattern (track address code) 205. Part of the address regions 202 are each provided with a unique pattern 208. Further, a home index pattern 209 is provided for one address region 202 on each track. The fine region 203 is provided with a fine pattern 206, while the clock region 204 is provided with a clock mark 207.

The above-described patterns and marks are as follows. The access pattern 205 is formed by coding a track address using, for example, the Gray code. The length and the position of the coded pattern are different from the other Gray code patterns on different tracks. The access pattern 205, which is used for positioning the magnetic head, is specifically required for shifting the magnetic head to a targeted track in the track/seek mode.

The fine pattern 206, which indicates the relative position of the magnetic head to the targeted track, is needed for accurately positioning the magnetic head to the center of the targeted track in the tracking mode. The fine pattern 206 is formed of four magnetic patterns, A, B, X and Y.

The clock mark 207 is used for generating clock information. More specifically, a data clock and a servo clock are generated by predetermined clock-generating means based on an isolated waveform reproduced from the clock mark 207. Although in this example the clock mark 207 is configured in a radially and continuously extended shape, various other shapes may be used.

The unique pattern 208 serves to recognize the rough position of the clock mark 207 during the initial synchronizing operation, which will be described in greater detail later. The unique pattern 208 is formed of a plurality of radially and continuously extended lines (patterns), and is easily detected even before the clock is generated. A violation code, which cannot possibly be included in a coded data string, is used to form the unique pattern 208.

The home index pattern 209 represents the rotational angle origin of the magnetic disk 200, which will be described below. The home index pattern 209 is configured in such a manner that it can be easily differentiated from the other patterns provided on a recording surface.

An explanation will now be given of an example of the initial synchronizing methods employed in a synchronous servo-type magnetic disk drive using the magnetic disk 200. It is necessary to detect the rough position of the clock mark 207 prior to an initial synchronizing operation. Thus, the foregoing unique pattern 208 is used as an auxiliary pattern. The unique pattern 208 is provided in the address region 202 where the access pattern 205 is not disposed, i.e., a unique pattern 208 is provided at fixed intervals on a track, for example, for each of several dozens of address regions 202 on each track.

Thus, in order to achieve initial synchronization, the unique pattern 208 is first detected, and after a lapse of a predetermined period measured by predetermined means, such as a clock generated by a quartz oscillator, a clock gate signal is generated to detect an isolated waveform reproduced from the clock mark 207. Based on the isolated waveform, a servo clock and a data clock are generated, thereby establishing initial synchronization.

After achieving initial synchronization, the above-described home index pattern 209 is detected and, upon detection of the home index pattern 209, the number of segments over which the magnetic head has passed is counted. Based on the number of segments, the tracking position (the position over which the magnetic head 24 floats) is recognized, thereby achieving segment synchronization, i.e., frame synchronization. Namely, the home index pattern 209 is used for recognizing the rotational angle origin.

Since one home index pattern 209 is provided on each track, a latency time of a maximum of one track revolution time is required to search the home index pattern 209. Accordingly, the same amount of time is needed for achieving frame synchronization, i.e., segment synchronization, before entering the recording/reproducing mode.

The data format used in a known magnetic disk drive is as follows. User data is recorded on or reproduced from a data area in a unit, which is referred to as a "sector" having, for example, 512 bytes. Before recording the user data, a sector identification code (hereinafter referred to as a "sector ID") and an error correcting code (hereinafter referred to as an "ECC") are added to the user data. Recorded on the sector ID are data-sector definition information and flag information representing defective sectors, together with a cyclic redundancy code (hereinafter referred to as a "CRC").

A segment, which is formed of a data area and a servo area, as noted above, represents a physical partition of a disk-like information recording medium. In contrast, a frame represents a logical partition corresponding to the information recorded on a segment. To record or reproduce the segment user data on or from a disk-like information recording medium, the logical data unit is used. Accordingly, the partitions of segments and the partitions of sectors do not necessarily coincide with each other, as illustrated in FIG. 17. Namely, the start points and the end points of the sectors are placed somewhere within the segments. In order to precisely perform a recording/reproducing operation, a hard disk controller is required to recognize in which data area of which segment the start point and the end point of a sector are placed. Thus, the information indicating the start point and the end point of a sector is recorded on the foregoing sector ID.

A method for recording user data without adding a sector ID is available. This method is referred to as "the IDless recording method". In the IDless recording method, the above-described data format is not used, and instead, the sector ID information is stored in means, such as a semiconductor memory, rather than being recorded on a disk. It is thus possible to make a small region, accounting for several per cents of the overall data area, available for the user data area, which should otherwise be spared.

The operation of an example of conventional magnetic disk drives using the IDless recording method will now be described with reference to FIG. 18. In FIG. 18, the elements corresponding to those of an embodiment of the present invention (explained later) shown in FIG. 4 are designated with like reference numerals. The conventional magnetic disk drive shown in FIG. 18 has a hard disk controller (hereinafter referred to as "the HDC") 12, a microprocessor (hereinafter referred to as "the MPU") 11 for controlling the operation of the magnetic disk drive, and a conventional random access memory (hereinafter referred to as "the buffer RAM") 13. The HDC 12 is loaded with various functions, such as an interface function for connecting the magnetic disk drive to a host computer, a data recording/reproducing control function, and a processing function which performs predetermined operations, such as adding an ECC based on recording/reproducing data. The random access memory 13 is provided to compensate for a difference in the data transfer rate between the host computer and the magnetic disk drive. Further, a timing generating circuit 16 generates, based on a clock signal supplied from a clock generating circuit 115, various timing signals required for recording/reproducing operations.

The HDC 12 is provided with a frame counter which counts, based on a segment (frame) signal supplied from the timing generating circuit 16, the number of frames over which a magnetic head 24 passes. Considering all the factors, such as the number of frames, the frame number set by the MPU 11 according to the recording/reproducing command, and the sector head signal supplied from the timing generating circuit 16, the position of the magnetic head 24 on a recording surface of the magnetic disk 200 is recognized by the HDC 12. Namely, by counting the number of segments from the rotational angle origin and the number of bytes by using the frame counter and the byte counter, respectively, the HDC 12 is always able to recognize the position of the magnetic head 24 on the magnetic disk 200.

Prior to the recording/reproducing operation, for example, when power is supplied to the magnetic disk drive, a sector ID information table is created in predetermined storage means, such as the buffer RAM 13, in the form of firmware of the MPU 11.

As noted above, the start point or the end point of a sector is placed, as shown in FIG. 17, somewhere within a segment on the magnetic disk 200. Accordingly, since servo areas interrupt a sector, it is necessary that the recording/reproducing operation is skipped during a period in which the magnetic head 24 passes over the servo area. The skip information required for controlling the recording/reproducing operation in the above manner and another type of information, such as defective and unusable sectors, are recorded in the sector ID information table.

FIG. 19 illustrates an example of the sector ID information table. Sector shown in this table indicates the sector number. Since one or a plurality of servo areas interrupt each sector, as noted above, each sector is divided into two or more sector fragments partitioned by the servo areas. The information concerning the sector fragments is indicated by SkipFlag, LastFlag, and Count. Sector fragments having SkipFlag "1" are unusable due to defects. Sector fragments having LastFlag "1" are finished halfway through a data area before reaching a subsequent servo area.

Count represents the number of bytes from the head to the end of a sector fragment. Count of a sector fragment having LastFlag "0" indicates the number of bytes from the head of the sector fragment to the servo-area starting point. Count of a sector fragment having LastFlag "1" indicates the number of bytes from the head of the sector fragment to the end of the sector to which the sector fragment belongs. Thus, the following operation is required for the sector fragments having LastFlag "0". When the number of bytes recorded on Count is reached after the data recording/reproducing operation is started, the data recording/reproducing operation is suspended to wait for the magnetic head 24 to pass over the servo area.

This will be explained in greater detail with reference to FIG. 20 in the case where the data recording/reproducing operation is performed on, for example, sector 1 shown in FIG. 19. The head of sector 1 is first recognized from a sector head signal supplied from the timing generating circuit 16. Since LastFlag of the sector fragment of sector 1 corresponding to the first line of the table shown in FIG. 19 indicates "0", "0200" shown in Count represents the number of bytes from the head of the first sector fragment of sector 1 to the starting point of the servo area. Accordingly, when "0200" is counted, the magnetic head 24 reaches the starting point of the servo area. It is thus necessary to suspend the data recording/reproducing operation and then to restart the operation after the magnetic head 24 passes over the servo area.

Processing is then executed on the second fragment of sector 1 shown in FIG. 19. Access is started from the head of the data area of the subsequent segment, and the number of bytes from the head to the end of the data area is counted in a manner similar to the first sector fragment. LastFlag of the second sector fragment of sector 1 indicates "1", the end point of the sector is located somewhere within the same data area. Accordingly, Count of "1FFF" in the table shown in FIG. 19 represents the number of bytes from the head of the second sector fragment of the sector 1, i.e., the head of the data area in the subsequent segment, to the end of sector 1 located somewhere within the same data area. When the HDC 12 counts up the total number of bytes including 512 bytes of a sector and bytes forming the ECC, the end of the sector can be recognized.

As discussed above, frame synchronization is achieved based on the unique pattern 208 and the home index pattern 209, and the sector ID table is created. In this state, the following recording/reproducing operation is ready to be performed. Upon receiving from the host computer an instruction to perform a recording or reproducing operation on a sector, the MPU 11 sets the start frame number, the start sector number, the end frame number, and the end sector number in various registers of the HDC 12. Then, the following operation is started based on the above numbers set in the registers.

Referring back to FIG. 18, a seek/tracking operation is first performed on the start track by a positioning control circuit 17. Upon completion of the seek/tracking operation, a disk sequencer of the HDC 12 is actuated. Every time a segment signal is received from the timing generating circuit 16, the frame counter counts up. After it is determined by referring to the count number of the frame counter that the foregoing start frame number set in the register of the HDC 12 is reached, a sector head pulse is fed from the timing generating circuit 16 to cause the sector counter to count up. Similarly, after it is recognized by referring to the sector ID information table that the targeted sector is reached, a recording/reproducing operation is initiated. Thereafter, the recording/reproducing operation continues while referring to the sector ID information table.

The following problems are encountered by the foregoing conventional disk-like information recording mediums and information recording/reproducing apparatuses using such disk-like information recording mediums. After synchronization is established relative to the clock mark based on the unique pattern, a latency time equal to a maximum of one track revolution time is required for detecting the home index pattern in order to achieve frame synchronization. This lengthy latency time is seriously critical particularly for switching recording surfaces. Namely, in a disk-like information recording medium having double recordable and reproducible surfaces, the transfer rate is seriously reduced from the normal transfer rate while the recording surfaces are switched.

In order to overcome the above drawback, when the home index pattern is recorded or formed on the address region, the rotational positions of double surfaces of the recording medium must be highly accurately aligned with each other. This eliminates the need for changing the frame counter number even after the recording surfaces are switched. It is also necessary to produce a highly precise recording/ reproducing magnetic head corresponding to each recording surface. The above requirements, however, greatly increase the complexity of the manufacturing processes of the disk-like information recording medium and the magnetic head.

The above-described problem is noticeable both in the synchronous servo-type magnetic disk drive and the sector servo-type magnetic disk drive. Particularly in the synchronous servo-type magnetic disk drive, since there are many servo samples, the physical pitch between servo areas becomes extremely small, thereby decreasing a margin in the manufacturing process for the disk-like information recording medium. Consequently, in order to ensure a sufficient level of reliability of an information recording medium, every time recording surfaces are switched, the home index pattern should always be detected so as to recognize the rotational position from the rotational angle origin.

The foregoing IDless recording method in which the data efficiency is improved also presents a problem concerning the reliability of the data recording operation. If the IDless recording method is not employed, i.e., if a sector ID is added to the user data of each sector, the recording operation is started by reading the sector ID recorded on the disk-like information recording medium. Thus, the possibility of performing a recording operation at an incorrect position is very small.

According to the IDless recording method, however, if a frame pulse or a sector pulse fails to be input into the HDC for some reason, the HDC counter is erroneously operated to perform a recording operation at an incorrect position. What is worse, once such a recording operation is started at an incorrect position, there is no measure to immediately stop the operation. More specifically, once a recording operation is started at an incorrect position, the recording operation is continuously performed on the areas over which the magnetic head passes until the magnetic head reaches the rotational angle origin to reset the frame counter. This may even destroy recorded data.

The foregoing problem is presented both in the synchronous servo method and in the sector servo method.

SUMMARY OF THE INVENTION

Accordingly, it is an object of the present invention to provide a disk-like information recording medium, an information recording/reproducing apparatus, an information reproducing apparatus, and a synchronizing method, all in which the time required for achieving initialization or switching recording surfaces of the recording medium is efficiently used or reduced.

It is another object of the present invention to provide an information recording/reproducing apparatus using an IDless recording method in which the foregoing object is achieved, and also, the reliability of the recorded data is improved.

To achieve the above objects, according to one aspect of the present invention, there is provided a disk-like information recording medium comprising a plurality of concentrically or spirally formed tracks which are equally divided into a plurality of segments. Each of the segments has a servo area for recording servo information and a data area for recording user data. The servo information has a segment ID formed by coding an information word representing a rotational angle measured from a rotational angle origin according to a predetermined coding method. The segment IDs are recorded or formed within the respective servo areas in such a manner that they are spaced uniformly in the track direction.

According to another aspect of the present invention, there is provided an information recording/reproducing apparatus using a disk-like information recording medium. The recording medium comprises a plurality of concentrically or spirally formed tracks which are equally divided into a plurality of segments. Each of the segments has a servo area for recording servo information and a data area for recording user data. The servo information has a segment ID formed by coding an information word representing a rotational angle measured from a rotational angle origin according to a predetermined coding method. The segment IDs are recorded or formed within the respective servo areas in such a manner that they are spaced uniformly in the track direction. The information recording/reproducing apparatus comprises decoding means for decoding the segment ID from a reproducing signal reproduced from the disk-like information recording medium, synchronization means for establishing frame synchronization based on a decoded value, and recording/reproducing means for performing a recording/reproducing operation based on the established frame synchronization.

According to a further aspect of the present invention, there is provided a method for establishing synchronization for use in an information recording/reproducing apparatus using a disk-like information recording medium. The recording medium comprises a plurality of concentrically or spirally formed tracks which are equally divided into a plurality of segments. Each of the segments has a servo area for recording servo information and a data area for recording user data. The servo information has a segment ID formed by coding an information word representing a rotational angle measured from a rotational angle origin according to a predetermined coding method. The segment IDs are recorded or formed within the respective servo areas in such a manner that they are spaced uniformly in the track direction. The method comprises the steps of: establishing initial synchronization by decoding the segment ID in a case where frame synchronization has not yet been established; detecting frame out-of-synchronization by decoding the segment ID after the initial-synchronization establishing step; and performing a predetermined operation to take measures against the frame out-of-synchronization detected in the step of detecting frame out-of-synchronization.

According to the above method, when n number of segment IDs are provided on each track, the rotational angle between the segment IDs is equivalent to a 1/n revolution. Thus, the product of a 1/n revolution and the number of segment IDs required to be decoded in the foregoing method for establishing synchronization is used as the rotational angle. For example, if two segment IDs are used for decoding by the foregoing method, the initial synchronizing operation can be completed within a 2/n revolution, thereby speedily achieving frame synchronization.

The position of a magnetic head used for a disk-like information recording medium should be recognized in order to establish frame synchronization. In conventional magnetic disk drives, it is further necessary to detect a home index pattern provided on each track in order to recognize the position of a magnetic head. According to the present invention, however, the detection of the home index pattern performed for achieving initial synchronization can be made unnecessary, thereby eliminating a latency time required for detecting the home index pattern.

Moreover, even though a disk-like information recording medium and a magnetic head are not manufactured with very high precision, the initial synchronizing operation can be speedily performed, thereby achieving speedy frame synchronization.

Further, according to the foregoing method for detecting frame out-of-synchronization and the method for taking measures against the detected frame out-of-synchronization, a recording operation, which has started on an incorrect area in an IDless recording format, can be promptly interrupted. Thus, the destruction of recorded data can be minimized, and the reliability of recorded data can be enhanced.

BRIEF DESCRIPTION OF THE DRAWINGS

FIG. 9 schematically illustrates an example of the configuration of a segment ID usable in still another embodiment of the present invention;

DESCRIPTION OF THE PREFERRED EMBODIMENTS

Figure 1:
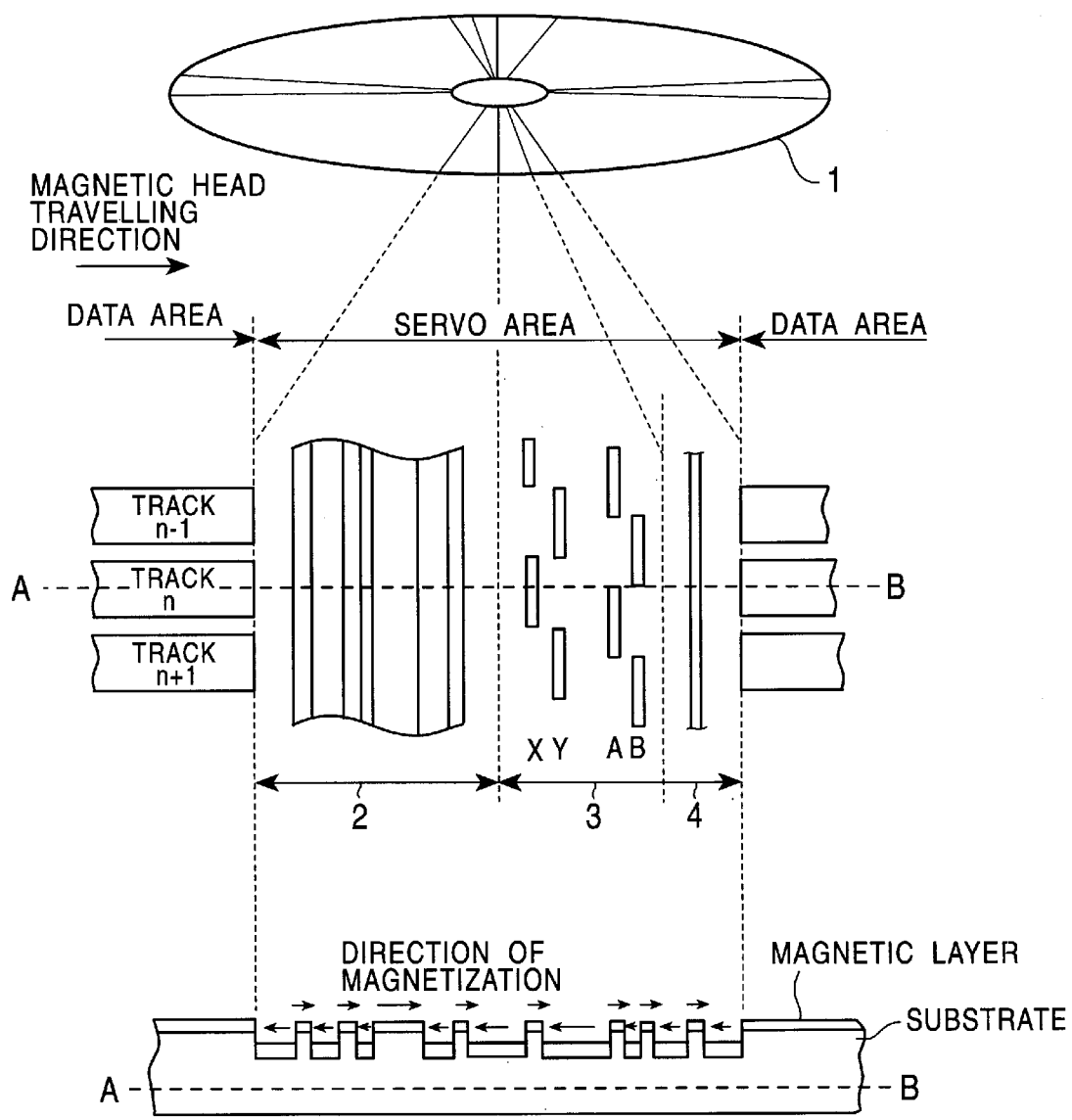
FIG. 1 is a schematic diagram illustrating the configuration of and around a servo area formed on a magnetic-disk recording medium according to an embodiment of the present invention.
Figure 16:
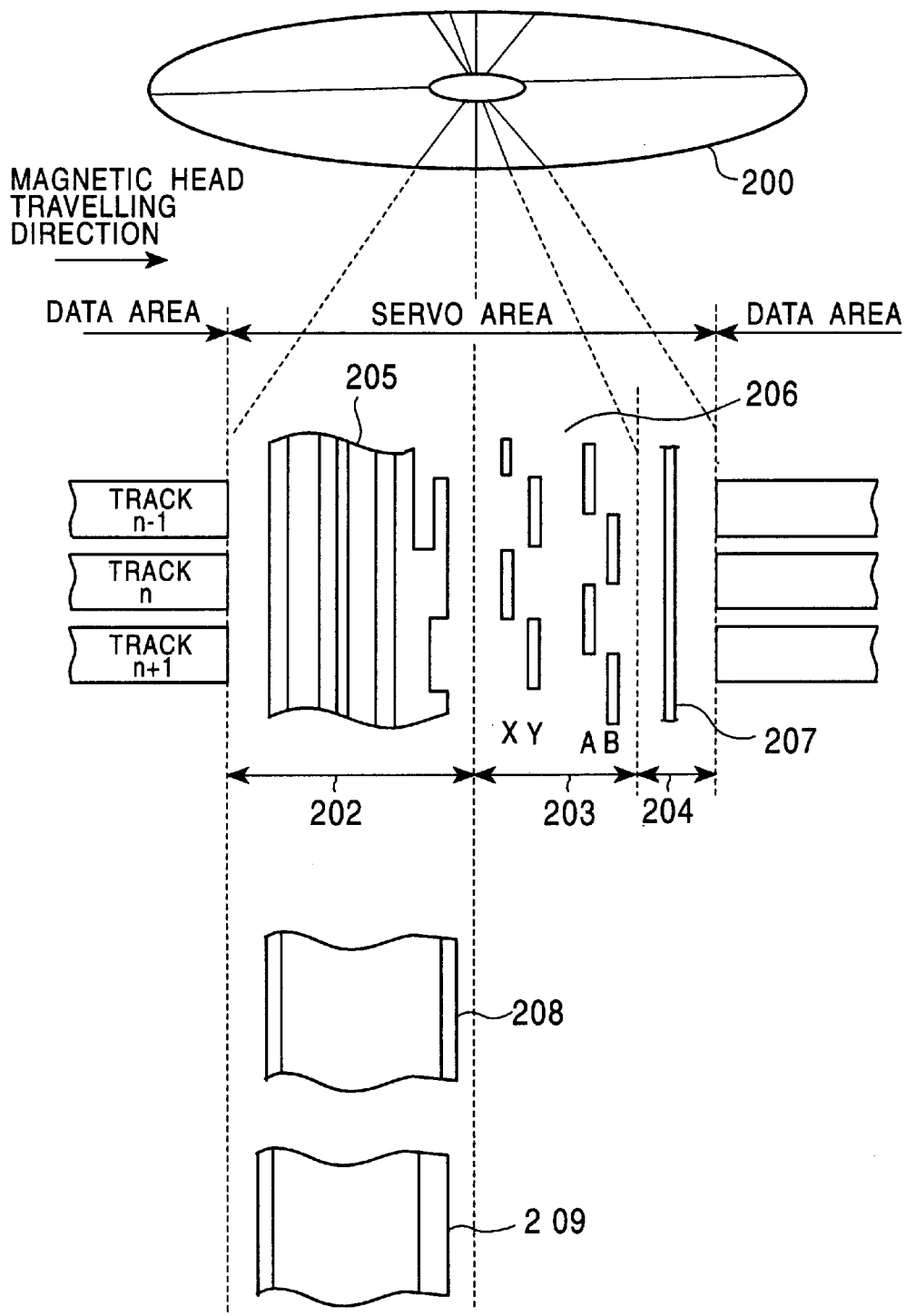
FIG. 16 is a schematic diagram illustrating the configuration of and around a servo area of a conventional magnetic-disk recording medium.
Figure 17:
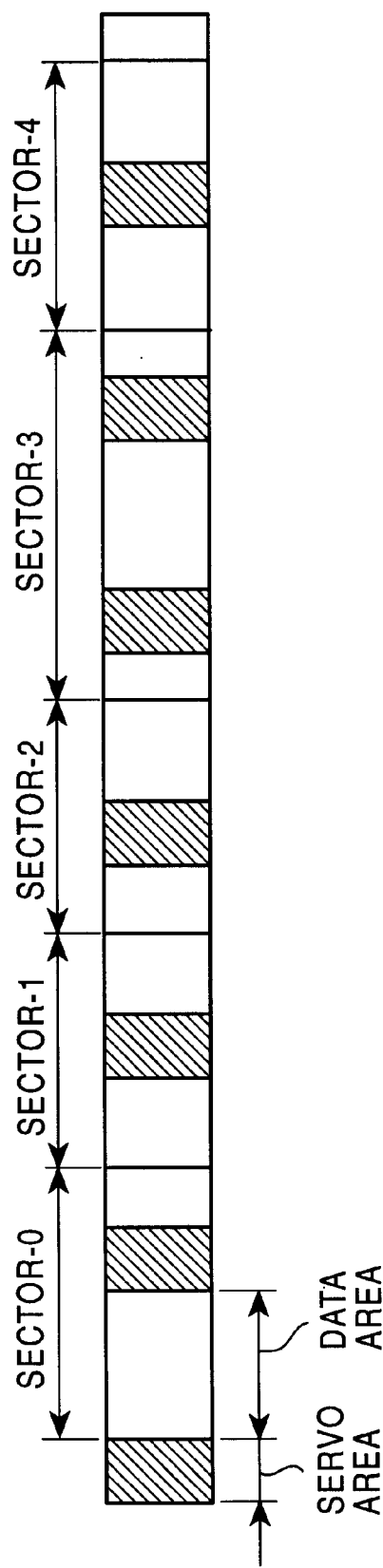
FIG. 17 schematically illustrates the positional relationship between segments (frames) and sectors.

An explanation will now be given of a disk-like information recording medium used in a synchronous servo-type magnetic disk drive according to an embodiment of the present invention. The arrangement of a servo area provided for a magnetic disk 1 of this embodiment is shown in FIG. 1. From the inner peripheral portion to the outer peripheral portion, the servo areas are formed on a recording surface of the magnetic disk 1 at equal time intervals in one track. Accordingly, the servo areas are intermittently provided in the form of a sector-like region having a predetermined center angle as viewed from the overall recording surface of the disk 1. Several hundreds of servo areas are provided on each track, each servo area being formed of an address region 2, a fine region 3, and a clock region 4. The length of the data area is similar to that of the conventional magnetic disk 200 shown in FIG. 16.

One of a segment ID, an access pattern, and a unique pattern is recorded on the address region 2 of each servo area in a predetermined order by a method described below. In this embodiment, the segment ID, the access pattern, the unique pattern, and the access pattern are sequentially provided for address regions 2. Accordingly, the segment ID is recorded on every four address regions 2, and the access pattern is recorded on every other address region 2. The unique pattern is recorded on every four address regions 2.

The fine region 3 is provided with a fine pattern, while the clock region 4 is provided with a clock mark. The leading edge and the trailing edge of each pattern form a reproducing isolated waveform, which will be described in greater detail.

The bottom portion of FIG. 1 is a cross-sectional view of the track center indicated by a broken line A-B of the upper portion of FIG. 1. The above-described marks and patterns are formed by magnetizing the projections and the depressions formed in a magnetic layer in the directions opposite to each other. The marks and patterns are produced by a known technique. More specifically, for example, all the embossed pits are formed on a non-magnetic substrate at one time by means such as stamping, and a magnetic layer is disposed on the non-magnetic substrate. The marks and patterns different from the data area are thus formed in a servo area. Further, the marks and the patterns are DC-magnetized in one direction by predetermined means, such as a magnetic head, thereby forming segment ID patterns, unique patterns, access patterns, fine patterns, and clock marks.

Figures 2, 3:
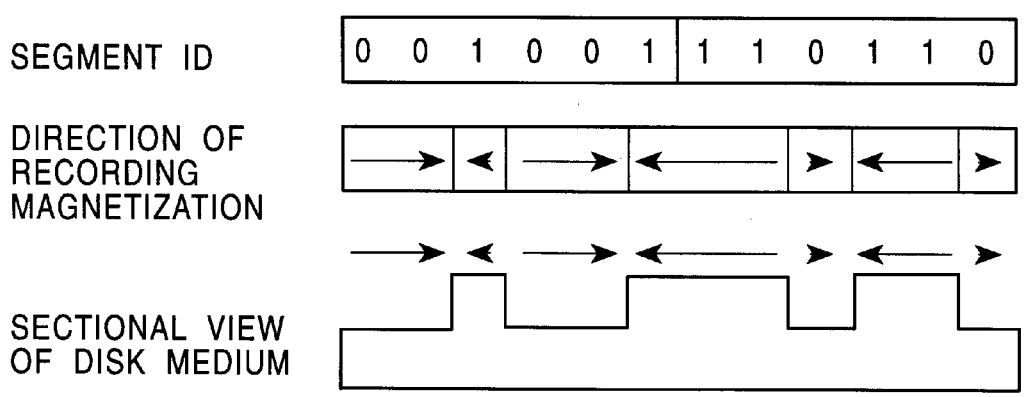
FIG. 2 schematically illustrates an example of a segment ID usable in an embodiment of the present invention.
FIG. 3 schematically illustrates the cross section of the segment ID formed on an embodiment of the present invention.

An example of the coding method used for forming the segment ID according to this embodiment of the present invention is shown in FIG. 2. The address region has 12 bits. The segment ID is sequentially formed of a 6-bit frame (segment) number, i.e., an information code, and a code formed by inverting the 6-bit information code (bit-inverted information code). In the following explanation, this coding method will be referred to as "the coding technique (2)".

More specifically, according to the coding technique (2), the information code and the bit-inverted information code are sequentially arranged, or the sequentially arranged codes are further rearranged as required, and the arranged or rearranged codes are used as a segment ID. Moreover, the frame (segment) number is sequentially numbered from 0. An example of the segment ID generated by forming all embossed pits at one time and being coded by the coding technique (2) is shown in FIG. 3.

By using the coding technique (2), the number of the bits "0" and the number of the bits "1" contained in the code can be substantially equal to each other. Thus, when the segment ID is generated by forming all the embossed pits at one time, the number of projections and the number of depressions are substantially equal to each other, thereby eliminating differences between the projections and depressions of the embossed pits. This makes it possible to improve the stability of a floating magnetic head, thereby stably obtaining reproducing signals from the disk-like information recording medium. This advantage is noticeable particularly when a Viterbi decoder is used as a segment ID decoder in which the direction of magnetization on a recording medium is represented by the internal state of the Viterbi decoder and is directly output.

Figure 4:
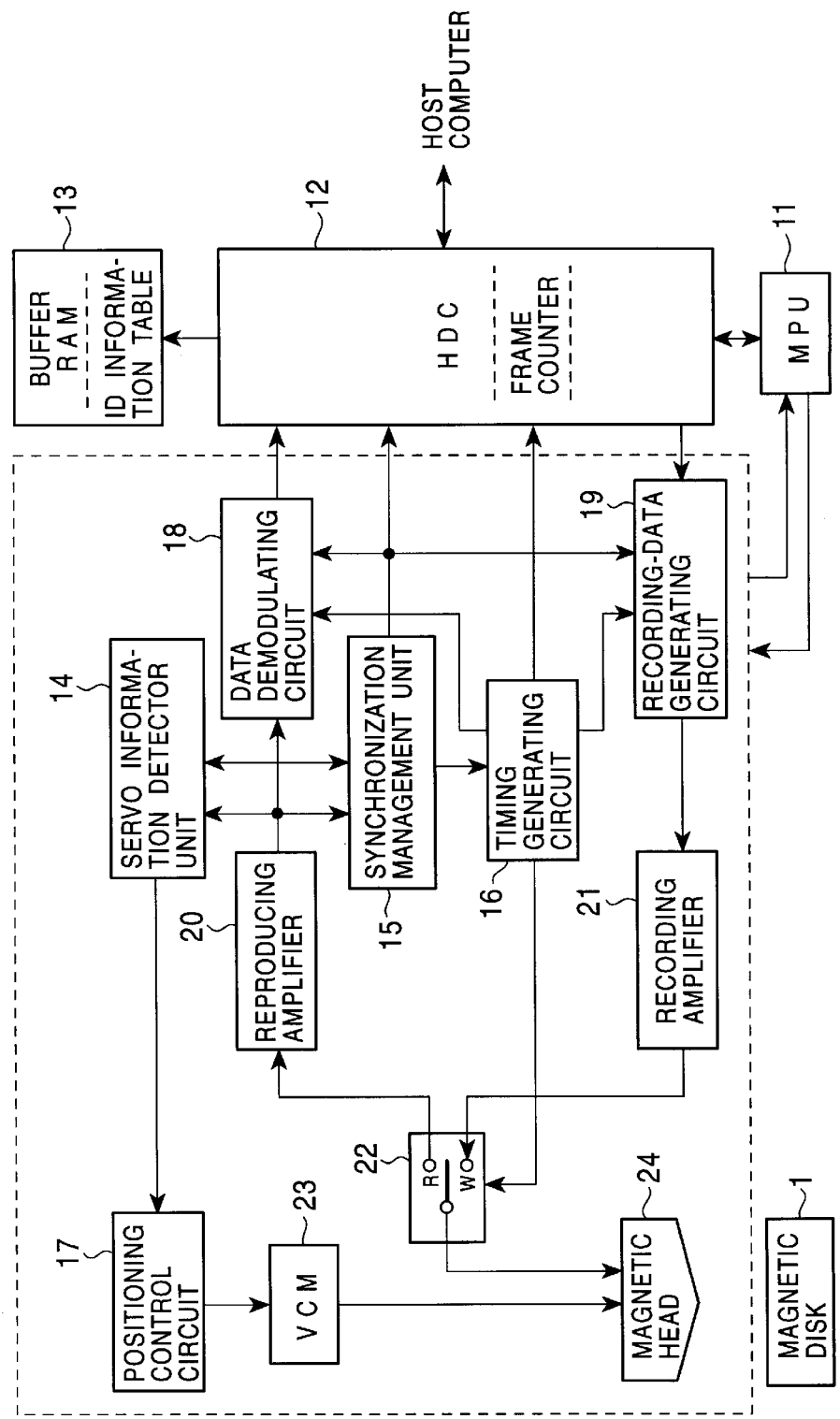
FIG. 4 is a block diagram illustrating the circuitry configuration of a magnetic disk drive according to an embodiment of the present invention.
Figure 18:
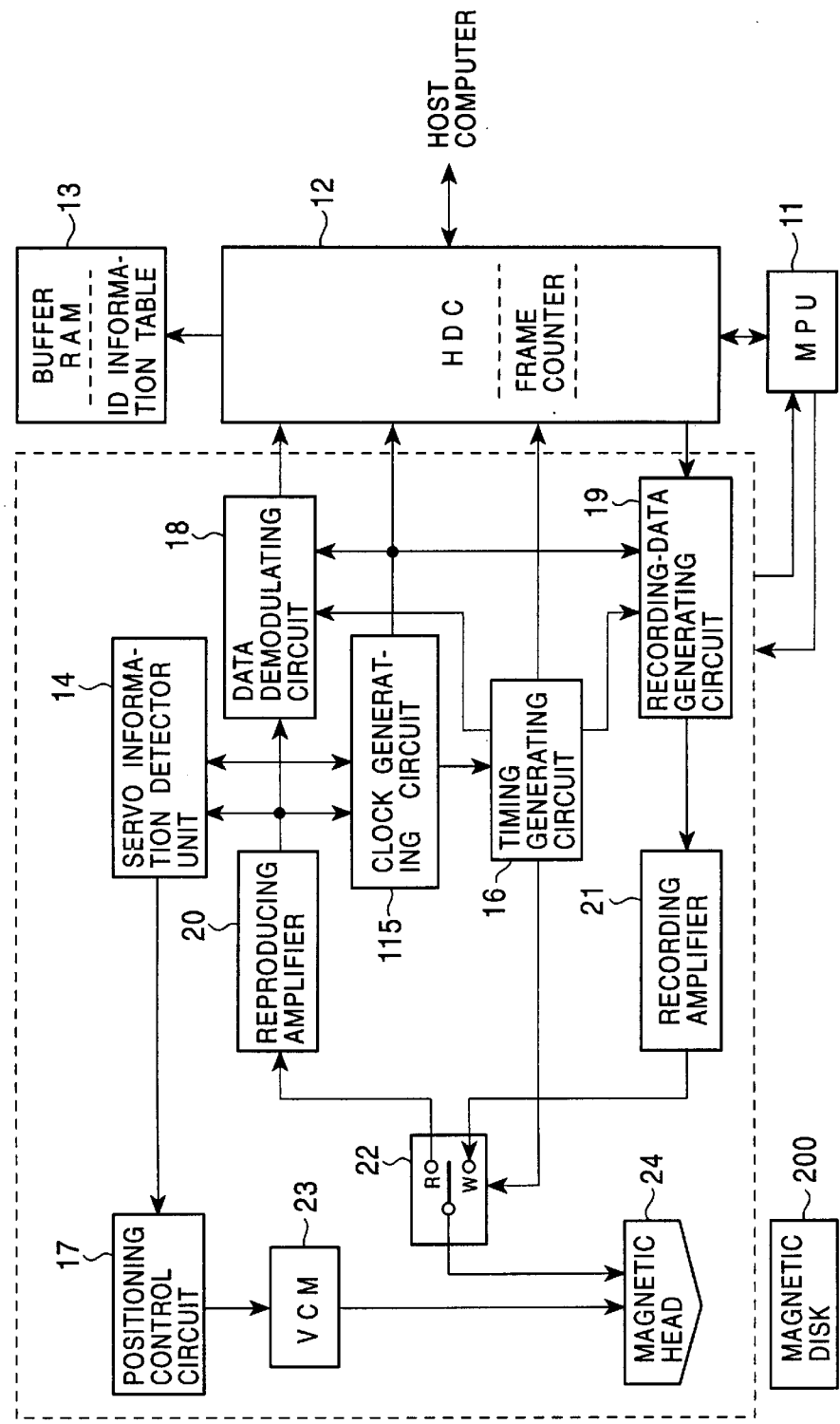
FIG. 18 is a block diagram illustrating the circuitry configuration of a known magnetic disk drive.

The circuitry configuration and the operation of the magnetic disk drive according to an embodiment of the present invention will now be explained. FIG. 4 illustrates the circuitry configuration of a synchronous servo-type magnetic disk drive using a recording/reproducing magnetic head. The elements similar to those of the known magnetic disk drive shown in FIG. 18 are designated with like reference numerals. A magnetic head 24 records data on and reproduces data from a magnetic disk 1. A recording/reproducing changeover switch 22 changes the operation modes of the magnetic head 24. Further, the recording/reproducing changeover switch 22 transmits recording data supplied from a recording amplifier 21 to the magnetic head 24, or transmits reading data supplied from the magnetic head 24 to a reproducing amplifier 20. The reproducing amplifier 20 and a data decoding circuit 18 form a data reproducing circuit system. Namely, reproducing data is generated by a reproducing signal supplied from the recording/reproducing changeover switch 22.

A synchronization management unit 15 detects, based on a reproducing signal fed from the reproducing amplifier 20, an isolated waveform reproduced from the foregoing clock mark formed on the clock region 4 disposed on the recording surface of the magnetic disk 1, thereby generating a data clock from the detected isolated waveform. Then, the generated data clock is supplied to the data decoding circuit 18, a recording-data generating circuit 19, a timing generating circuit 16, and a hard disk controller (HDC) 12. The synchronization of the system can be managed by the data clock.

The recording-data generating circuit 19 adds, for example, an error correcting code, and generates a recording data signal in synchronization with the data clock based on the recording data fed from the HDC 12. The generated recording data is then supplied to a recording amplifier 21. The recording amplifier 21 then generates a signal modulated by the recording data signal and feeds it to the magnetic head 24 via the recording/reproducing changeover switch 22. The magnetic head 24 thus performs recording on the magnetic disk 1 based on the received signal.

The timing generating circuit 16 generates various timing signals required for recording/reproducing operations by counting the data clocks, such as a data gate signal, a servo gate signal, a clock gate signal, a frame pulse, a sector pulse, and a synchronizing signal.

A positioning control circuit 17 controls tracking servo of the magnetic head 24. More specifically, the positioning control circuit 17 generates a control signal based on a signal supplied from a servo information detector unit 14 to drive a voice coil motor 23, thereby tracking the magnetic head 24 to a targeted track (track/seek mode). Thereafter, the positioning control circuit 17 positions the magnetic head 24 to the center of the track (tracking mode).

The HDC 12 is formed of four blocks, such as an I/O interface for connecting the magnetic disk drive to a host computer, a disk controller for controlling the recording/reproducing operation on the magnetic disk 1, a buffer controller for controlling the writing/reading operation on a buffer RAM 13, and an MPU interface for connecting the magnetic disk drive to an MPU 11. In this embodiment, the HDC 12 performs a recording operation according to the IDless recording method.

Figures 19, 20:
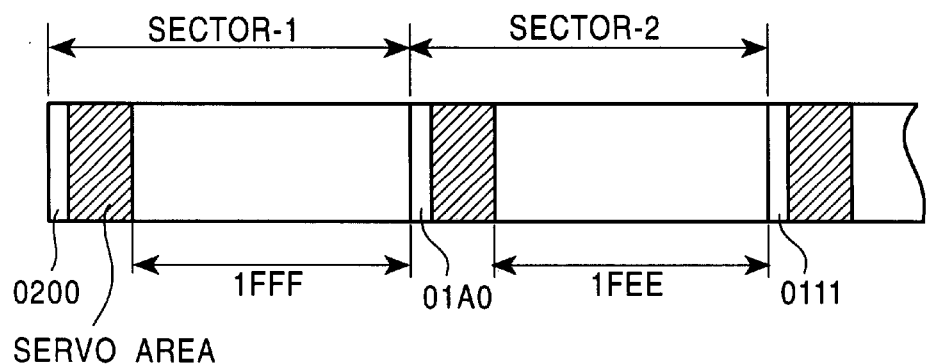
FIG. 19 schematically illustrates an example of an ID information table used in an IDless recording method.
FIG. 20 schematically illustrates the recording/reproducing operation based on the ID information table shown in FIG. 19.

The buffer RAM 13 serves to compensate for a difference in the data transfer rate between the host computer and the magnetic disk 1 by temporarily retaining recording/reproducing data in the buffer RAM 13. In addition to the above known function, according to this embodiment, the buffer RAM 13 is used as a memory area in which a sector ID map required for the IDless recording operation is generated. Namely, when power is supplied to the magnetic disk drive, a sector ID map similar to, for example, the ID table shown in FIG. 19, is created in part of the buffer RAM 13 in the form of firmware of a system controller. The sector ID map is referred to as required during the operations of the MPU 11 and the HDC 12.

Figure 5:
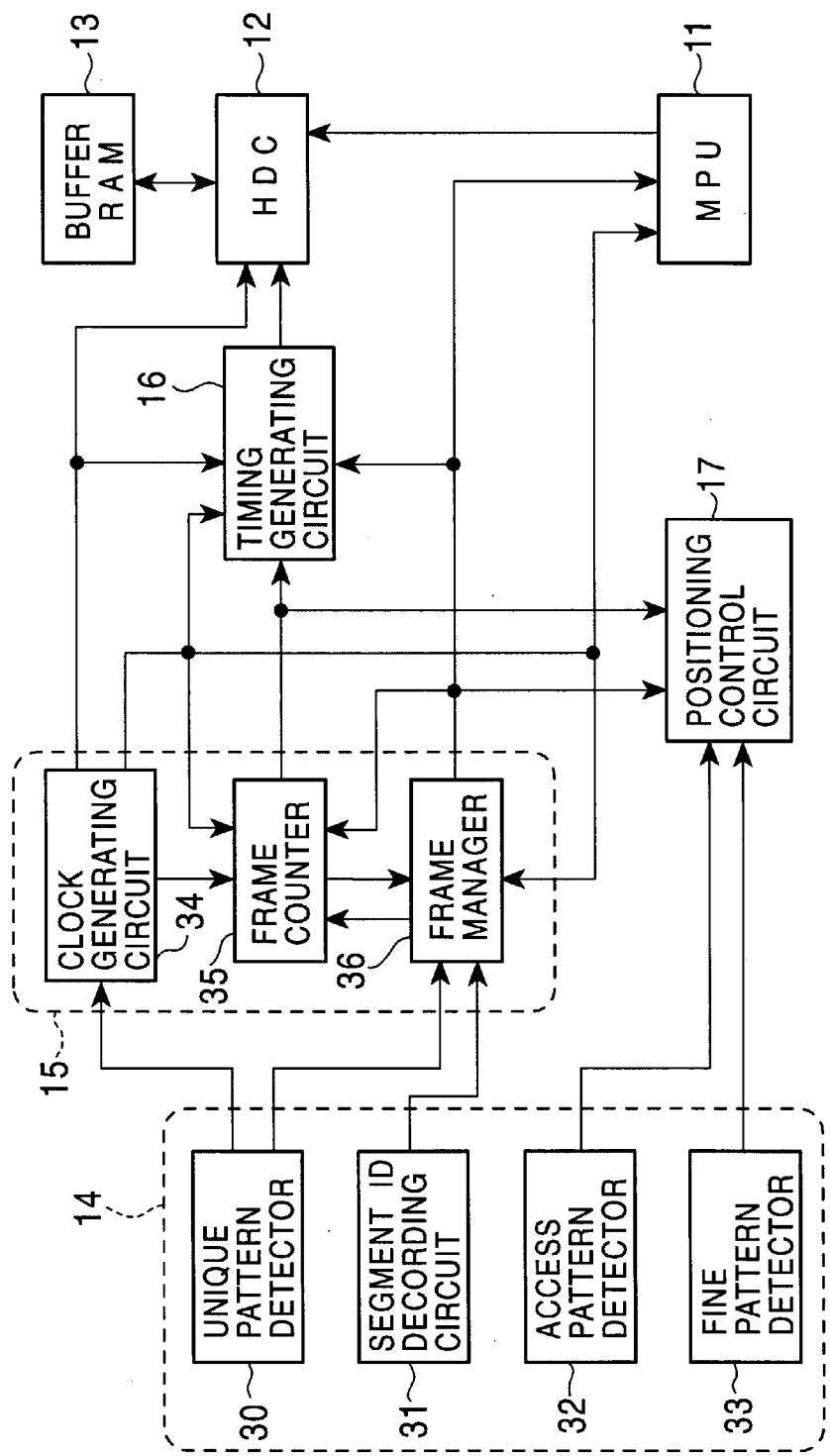
FIG. 5 is a block diagram illustrating details of part of the circuitry configuration shown in FIG. 4.

The servo information detector unit 14, the synchronization management unit 15, and the timing generating circuit 16 illustrated in FIG. 4 are shown in more detail in FIG. 5. The servo information detector unit 14 is formed of a unique pattern detector 30, a segment ID decoding circuit 31, an access pattern detector 32, and a fine pattern detector 33. The synchronization management unit 15 is formed of a clock generating circuit 34, a frame counter 35, and a frame manager 36. Among the above elements, the clock generating circuit 34 generates a PLL lock signal and supplies it to the MPU 11, thereby controlling servo pit synchronization. In contrast, the frame manager 36 generates a frame lock signal and supplies it to the HDC 12 via the timing generating circuit 16, thereby controlling frame synchronization.

Figure 6:
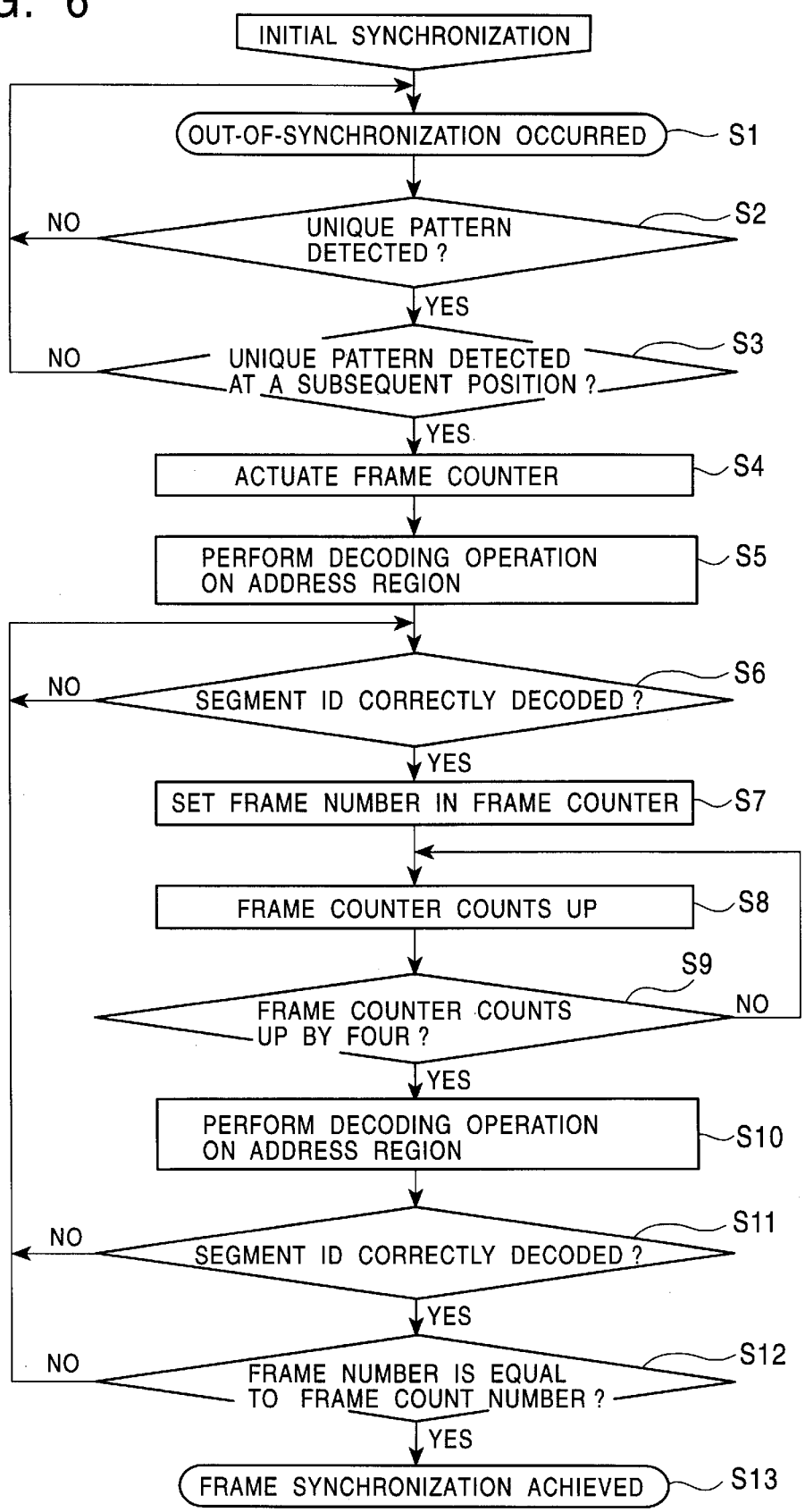
FIG. 6 is a flow chart illustrating an algorithm for establishing initial synchronization according to an embodiment of the present invention.

In this embodiment, an operation for detecting that a frame is out of synchronization is performed, which will be described in greater detail below, and it is constantly monitored whether the frame is out of synchronization after initial synchronization is achieved. If it is found that the frame is out of synchronization, or that frame synchronization has not been established immediately after power was supplied, the initial synchronizing operation is performed. The initial synchronizing operation will now be described with reference to the flow chart of FIG. 6. If it is detected in step S1 that a frame is out of synchronization, it is determined in step S2 whether the unique pattern detector 30 has detected a unique pattern from a reproducing waveform which corresponds to one track revolution of the magnetic disk 1 and is supplied from the reproducing amplifier 20.

The specific method for detecting the unique pattern is, for example, as follows. The unique pattern detector 30 has predetermined storage means. The signal reproduced from the unique pattern and the time interval during which the signal reproduced from the unique pattern is obtained have been stored in the predetermined storage means. Then, the signal matching the unique pattern is searched from the reproducing signal string. During this searching operation, the operation timing of the unique pattern detector 30 is provided in accordance with the clock generated by predetermined means, such as a quartz oscillator.

If it is found in step S2 that the unique pattern has been detected, the process proceeds to step S3 in which it is further determined whether the signal is locked based on the unique pattern. This operation in step S3 is performed by, for example, the following method.

As noted above, the unique pattern detector 30 stores the time interval during which the signal reproduced from the unique pattern is obtained. The unique pattern detector 30 thus opens a gate based on the time interval during which the unique pattern is detected, and determines whether the signal reproduced from the unique pattern is detected within the gate. In this manner, it is further confirmed that the signal reproduced from the unique pattern is detected in accordance with the foregoing configuration of the magnetic disk 1 at a position subsequent to the position at which the unique pattern has been initially detected on the recording surface of the magnetic disk 1.

If it is found in step S3 that the signal reproduced from the unique pattern has suitably been detected a predetermined number of times, for example, twice, it is determined that the signal is locked based on the unique pattern. Then, the process further proceeds to step S4 in which the frame counter within the HDC 12 is actuated. Further, every time the signal reproduced from the unique pattern is detected, the unique pattern detector 30 generates a clock gate signal after a lapse of a predetermined number of clocks upon detecting the above signal. The unique pattern detector 30 then supplies the clock gate signal to the clock generating circuit 34. A predetermined number of clocks are counted by a clock generated by predetermined means, such as a quartz oscillator.

As discussed above, the clock generating circuit 34 is supplied with a clock gate signal from the unique pattern detector 30 with a fixed period based on the interval during which the signal reproduced from the unique pattern is detected. The clock generating circuit 34 regards the isolated waveform which is detected while the clock gate signal is open as a normal clock signal, i.e., a signal reproduced from the clock mark formed on the clock region 4 of the magnetic disk 1. The clock generating circuit 34 then updates the phase of a built-in PLL. Subsequently, the clock signal is phase-synchronized with the servo clock and the data clock. In this manner, a clock used as a reference of the recording/reproducing operation is established.

Based on the servo clock, the gate is open to the signals reproduced from the servo areas, in particular, from the address regions, of the corresponding segments. The signal reproduced from the address region is supplied to the unique pattern detector 30, the segment ID decoding circuit 31, and the access pattern detector 32. Then, various patterns required for the recording/reproducing operation are detected (step S5).

In step S6, the segment ID decoding circuit 31 determines whether the segment ID has been correctly decoded. In this embodiment, the segment ID generated by using the coding method explained with reference to FIG. 2 is employed. It is thus judged whether the segment ID has been correctly decoded by the following procedure in accordance with the coded segment ID. The 12-bit code detected from the reproducing signal is first divided into two bit strings, i.e., a first 6-bit word and a second 6-bit word, by the foregoing gate. Then, only when the second 6-bit word represents the inverted word from the first 6-bit word is it determined that the segment ID has been correctly decoded. Thus, the segment ID decoding circuit 31 supplies a signal indicating that the segment ID has been correctly decoded and the first 6 bit string (frame number) to the frame manager 36.

Upon receiving the signal representing that the segment ID has been correctly decoded, the frame manager 37 sets the frame number fed from the segment ID decoding circuit 31 in the frame counter 35 (step S7). Thereafter, in step S8, the frame counter 35 counts up based on the segment (frame) signal supplied from the timing generating circuit 16.

As discussed above, the segment ID is provided for the address region 2 of every four segments. In response to such an arrangement, the frame manager 36 confirms according to the following procedure in steps S9 through S12 that frame synchronization has been achieved.

The frame manager 36 determines in step S9 whether the count number of the frame counter 35 increases by four from the frame number set in step S7. If the answer in step S9 is yes, the process proceeds to step S10 in which the signal reproduced from the address region 2 is considered as the segment ID and then decoded. It is then judged in step S11 in a manner similar to step S6 whether the signal has been accurately detected.

If the answer of step S11 is yes, the process proceeds to step S12 in which the frame number obtained by the decoding operation in step S10 coincides with the count number of the frame counter determined in step S9. If the answer of step S12 is yes, the process further proceeds to step S13 in which it is concluded that frame synchronization has been established. Moreover, the frame manager 36 makes the frame lock signal active for the HDC 12, the MPU 11, and the positioning control circuit 17. At this time, the initial synchronizing operation is completed.

In the above-described initial synchronizing operation, step S3 of determining whether the signal is locked based on the unique pattern, and steps S9 through S12 for confirming whether initial synchronization has been achieved may be repeated a suitable number of times in consideration of the following various characteristics: the reliability demanded for the magnetic disk drive of the present invention and the working precision of the magnetic disk 1 and the magnetic head 24 used in the magnetic disk drive.

In the track/seek mode, the access pattern detector 32 within the servo information detector unit 14 detects the access pattern in accordance with the servo gate supplied from the timing generating circuit 16. The detected access pattern is then decoded to recognize a current track number. In accordance with a difference between the current track number and the track number of a recording/reproducing track set by the MPU 11, which will be described below, the positioning control circuit 17 controls the voice coil motor 23 by a known method to cause it to perform a tracking operation on a recording/reproducing track.

In the subsequent tracking mode, based on the information obtained by detecting the above-described fine pattern by the fine pattern detector 33 of the servo information detector unit 14, the positioning control circuit 17 controls the voice coil motor 23 and causes it to position the magnetic head 24 to the center of the recording/reproducing track.

As discussed above, the access pattern is provided for every other address region. In this embodiment, the access patterns are disposed on the address regions of odd-numbered segments. Accordingly, upon and after receiving the frame number 0 from the frame counter 35, the access pattern detector 32 decodes the reproducing data which only corresponds to the odd-numbered segments and which is supplied from the servo information detector unit 14. The access pattern detector 32 then supplies the decoded data to the positioning control circuit 17. In a magnetic disk drive using a magnetic disk having an access pattern arranged differently from the access pattern used in this embodiment, the corresponding operation suitable for the used access pattern should be performed.

The recording operation will now be discussed. In response to a recording command from the host computer, the MPU 11 converts a logic block address fed from the host computer to a physical address (such as Zone, Cylinder, Head, or Sector) by referring to the foregoing ID information table created in the buffer RAM 13. The converted physical address is set in the HDC 12, the positioning control circuit 17, and the recording/reproducing changeover switch 22. Access is then made to a recording sector based on the physical address by performing the above-described track/seek operation. By the operation for detecting frame out-of-synchronization performed by the frame manager 36, which will be discussed later, it is guaranteed that a frame is not out of synchronization, and thus, the recording operation at a correct position can be ensured. The recording operation after the recording sector is accessed is performed by a known method.

The reproducing operation of the recorded user data will now be explained. Upon receiving a reproducing command from the host computer, the MPU 11 converts a logical block address fed from the host computer into a physical address (such as Zone, Cylinder, Head, or Sector), while referring to the ID information table generated in the buffer RAM 13. The physical address is then set in the HDC 12, the positioning control circuit 17, and the recording/reproducing changeover switch 22. Based on the physical address, access is made to the reproducing sector by the foregoing track/seek operation. Since the operation for detecting frame out-of-synchronization (described below) guarantees that a frame is not out of synchronization, the reproducing operation at an accurate position can be ensured. The reproducing operation subsequent to the access made to the reproducing sector is conducted by a known method.

As described above, in order to perform a recording/reproducing operation at a correct position, it is necessary to ensure that a frame is not out of synchronization. To satisfy this requirement, an operation for detecting frame out-of-synchronization based on the segment ID is performed in the following manner. Immediately after initial synchronization is achieved, the frame out-of-synchronization detection is started, and continues during a recording/reproducing operation.

Figure 7:
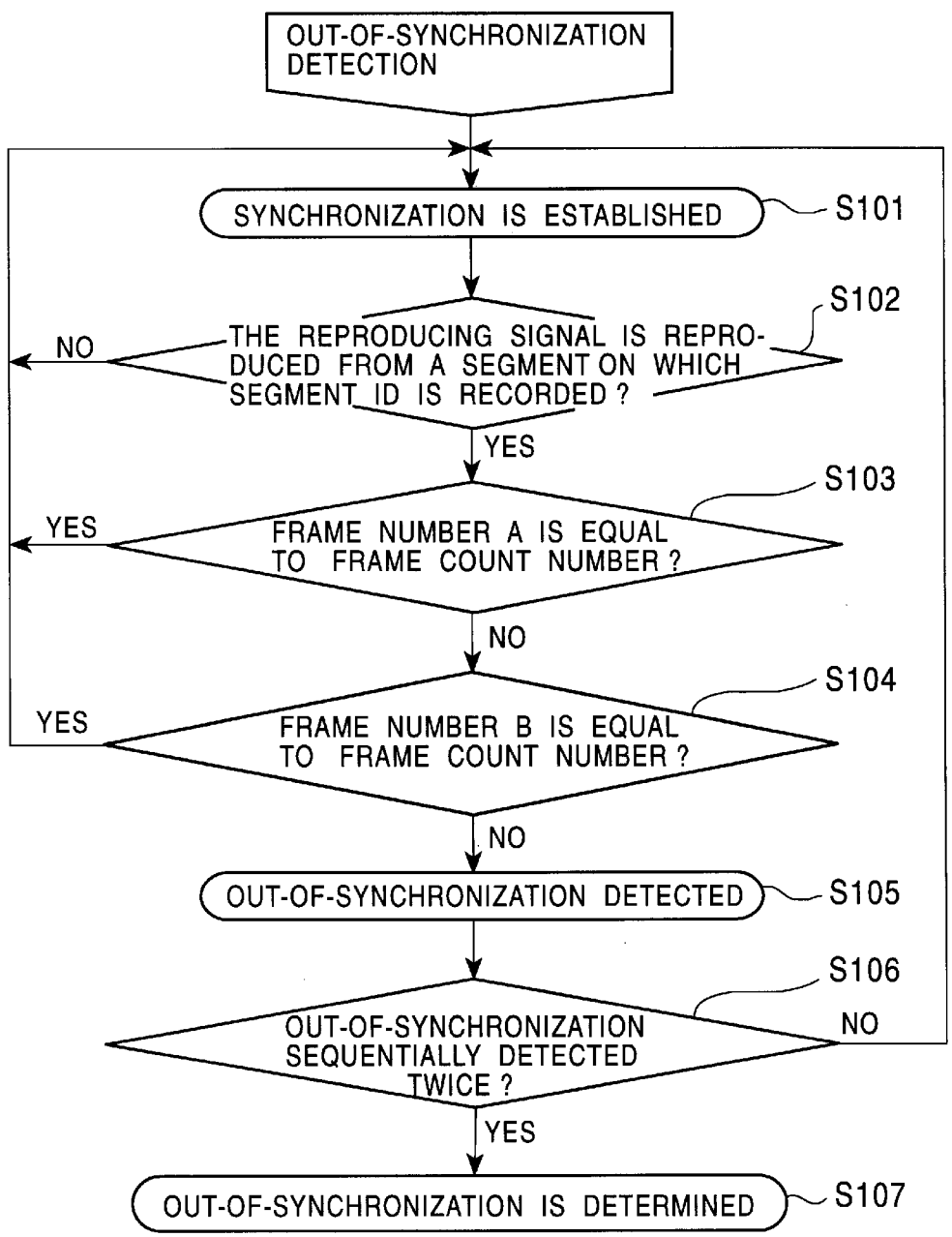
FIG. 7 is a flow chart illustrating an algorithm for detecting frame out-of-synchronization according to an embodiment of the present invention.

The procedure of the frame out-of-synchronization detection will now be explained with reference to the flow chart of FIG. 7. Frame synchronization is established in step S101. Even after frame synchronization is achieved, a signal reproduced from the address region is continuously supplied from the reproducing amplifier 20 to the segment ID decoding circuit 31 within the servo information detector unit 14. It is then determined in step S102 whether the signal supplied from the reproducing amplifier 20 has been reproduced from the address region of the segment on which a segment ID is recorded (a segment ID is recorded on every four segments).

If the answer of step S102 is yes, the process proceeds to step S103 in which the segment ID decoding circuit 31 executes the following processing on the segment ID, i.e., the 12-bit code. The 12-bit code is first divided into two bit strings, i.e., a first 6-bit word and a second 6-bit word. The first 6-bit word is set as a frame number A, while the second 6-bit word is set as a frame number B. The frame number A and the frame number B are transmitted to the frame manager 36.

The frame manager 36 compares the received two frame numbers (the frame number A and the frame number B) with the frame number of the frame counter. Upon comparison, if both frame number A and frame number B are different from the frame counter number, the process proceeds to step S105 in which it is indicated that a frame is out of synchronization.

The detailed procedure for comparing the frame number A and the frame number B with the frame count number is as follows. It is first judged in step S103 whether the frame number A is equal to the frame counter number. If the answer of step S103 is no, the process proceeds to step S104 in which it is further determined whether the frame number B is equal to the frame counter number. If the answer of step S104 is no, i.e., neither of frame number A and frame number B is equal to the frame count number, the process proceeds to step S105 in which it is concluded that a frame is out of synchronization.

In contrast, if either of frame number A or frame number B coincides with the frame count number in step S103 or S104, it is concluded that a frame is not out of synchronization, and the process returns to step S101.

After step S105, the process proceeds to step S106 in which it is further confirmed whether a frame is not out of synchronization. More specifically, the signal reproduced from the address region of a segment on which a subsequent segment ID may be recorded is regarded as the segment ID and is then decoded. Based on the decoded ID, processing similar to the operation for detecting frame out-of-synchronization performed in steps S102 through S104 is executed.

More specifically, if both frame numbers (the frame number A and the frame number B) are different from the frame counter number, it is determined that a frame is out of synchronization once again. In this manner, if it is concluded in step S106 that a frame is sequentially out of synchronization twice, it is determined that frame out-of-synchronization has been detected.

On the other hand, if it is found in step S103 or S104 that at least one of the two frame numbers coincides with the frame counter number, it is determined that a frame is not out of synchronization, and the process returns to step S101.

If it is concluded in step S106 that a frame is out of synchronization, the following processing is performed. If frame out-of-synchronization is detected during the recording operation, an emergency write inhibit operation is performed to minimize the recording operation on an incorrect area in the following manner. The write gate supplied by the timing generating circuit 16 is switched off. Further, the operation of the MPU 11 is interrupted. Thereafter, suitable processing is executed on a peripheral circuit.

In contrast, even if data is reproduced from an incorrect position due to frame out-of-synchronization, the recorded data is protected from being destroyed. Consequently, if frame out-of-synchronization is detected during the reproducing operation, the MPU 11 executes suitable processing rather than performing an emergency read inhibit operation.

To directly take measures against the foregoing frame out-of-synchronization, appropriate processing, such as the emergency write inhibit operation, is performed, and then, the foregoing initial synchronizing operation is conducted. Upon completing the initial synchronizing operation, the recording/reproducing operation interrupted a frame out-of-synchronization condition is restarted.

The operation for detecting frame out-of-synchronization explained in steps S101 through S107 correctly functions only in a magnetic disk drive having a very small lower-bit error rate. In a magnetic disk drive having a comparatively large lower-bit error rate, frame out-of-synchronization may be overdetected (it is wrongly determined that a frame is out of synchronization). To overcome this drawback, the algorithm may be modified in consideration of the magnitude of the lower-bit error rate of a magnetic disk drive to which the present invention is applied. For example, in step S106, it may be determined that a frame is out of synchronization only when frame out-of-synchronization has been sequentially detected three times.

An explanation will further be given of the more demanding conditions for detecting frame out-of-synchronization according to another embodiment of the present invention compared to the conditions set in the previous embodiment. The algorithm used in this embodiment will be described with reference to the flow chart of FIG. 8. The elements other than the algorithm, i.e., the configuration of the magnetic disk and the circuitry configuration of the magnetic disk drive, are similar to those of the previous embodiment.

In the foregoing embodiment, frame synchronization is confirmed by checking whether the two frame numbers decoded by the segment ID decoding circuit 31 are different from the frame counter number by the following operations: a frame out-of-synchronization detection (steps S101 through S104 of the flow chart of FIG. 7), an indication that frame out-of-synchronization has been detected (S105), and detecting once again as to whether frame is not out of synchronization (step S106).

On the other hand, in this embodiment, the operation for detecting frame out-of-synchronization is performed in the following manner. Only when it is determined that the frame number obtained by the segment ID decoding circuit 31 has been correctly decoded is it further checked whether the decoded frame number coincides with the frame counter number.

Figure 8:
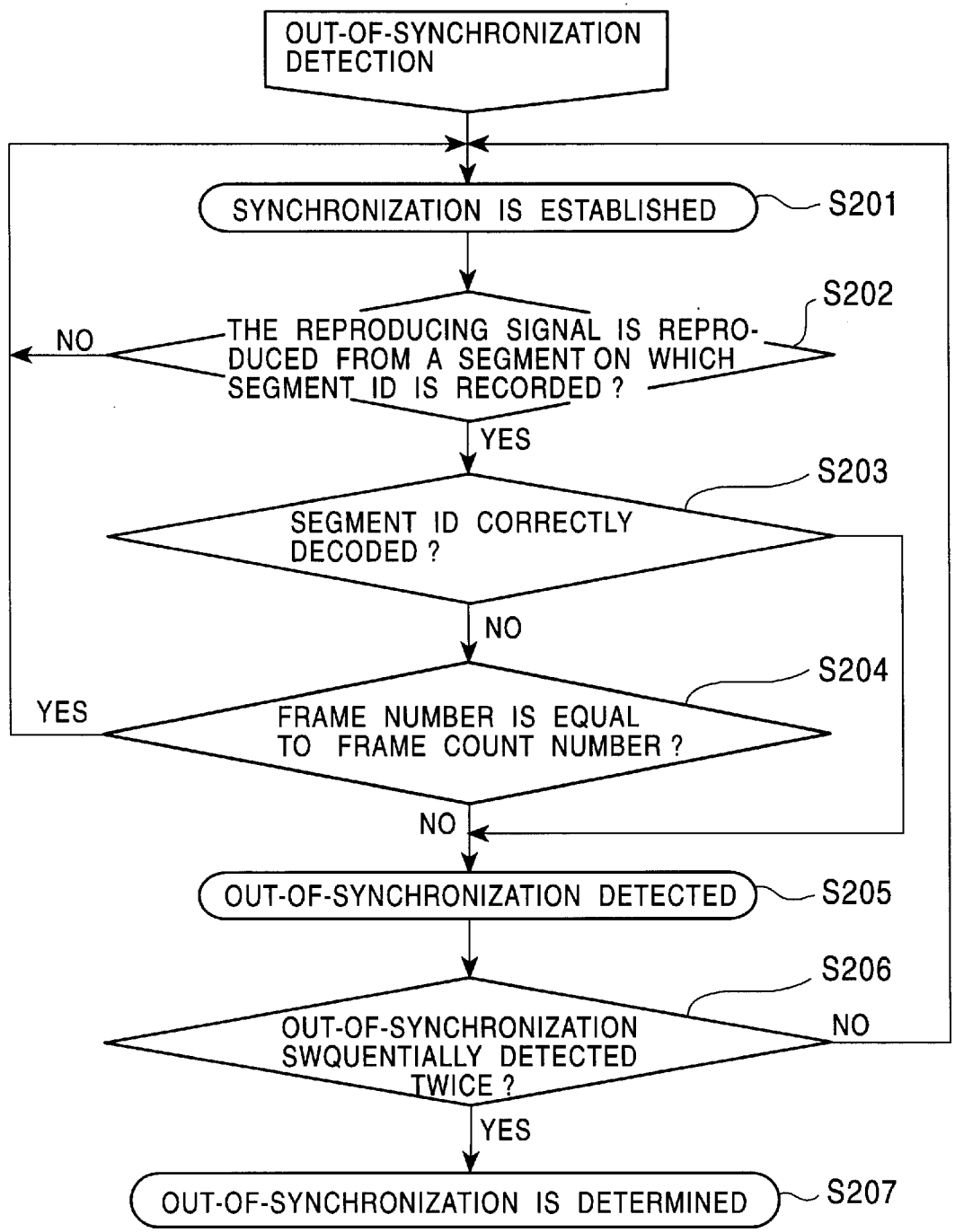
FIG. 8 is a flow chart illustrating an algorithm for detecting frame out-of-synchronization according to another embodiment of the present invention.

The more specific procedure will now be described with reference to the flow chart of FIG. 8. After frame initialization is established, i.e., after step S201, the following operation for detecting frame out-of-synchronization is started. It is determined in step S202 whether the received signal has been reproduced from an address region of a segment in which a segment ID is recorded (a segment ID is recorded in an address region of every four segments). If the answer of step S202 is yes, the process proceeds to step S203.

In step S203, a 12 bit code, i.e., the segment ID, is first divided into two bit strings, i.e., a first 6-bit word and a second 6-bit word. It is then checked whether the frame number decoded from the first 6-bit word coincides with the frame number decoded from the inverted word of the second 6-bit word. If it is found in step S203 that the two frame numbers are not equal to each other, i.e., that the segment ID has not been correctly decoded, the process proceeds to step S205.

In contrast, if it is concluded in step S203 that the two frame numbers coincide with each other, i.e., that the segment ID has been accurately decoded, the process proceeds to step S204. In step S204, it is further checked whether the reproduced frame number, i.e., the frame number decoded in step S203, is equal to the frame counter number. If the answer of step S204 is yes, it is concluded that a frame is not out of synchronization, and the process returns to step S201.

As described in the introduction of this embodiment, if it is found in step S204 that the frame number does not coincide with the frame counter number, the process proceeds to step S205 and further to step S206 in which the following processing is executed.

A signal reproduced from an address region of a segment in which a subsequent segment ID may be recorded is first decoded. Then, an operation for detecting frame out-ofsynchronization similar to the operation in steps S203 and S204 is performed. If it is detected once again that a frame is out of synchronization, it is concluded that a frame is out of synchronization. The process then proceeds to step S207 in which the processing similar to the operation in order to take measures against frame out-of-synchronization is executed. On the other hand, if the answer of step S206 is no, it is determined that a frame is not out of synchronization, and the process returns to step S201.

In the foregoing embodiments, the above-described coding technique (2) is used for forming a segment ID. =According to still another embodiment, a coding method other than the coding technique (2) may be employed. In this embodiment, the elements other than the algorithm used in this embodiment, i.e., the configuration of the magnetic disk and the circuitry configuration of the magnetic disk drive are similar to those of the foregoing embodiments.

In the following explanation, the coding method used in this embodiment will be referred to as "the coding technique (1)". An example of the segment ID formed by the coding technique (1) is shown in FIG. 9. The address region has 12 bits. A 6-bit frame (segment) number is repeated twice. Namely, according to the coding technique (1), a code is formed by repeating an information word a plurality of times or by rearranging the repeated information word as required.

Figure 10:
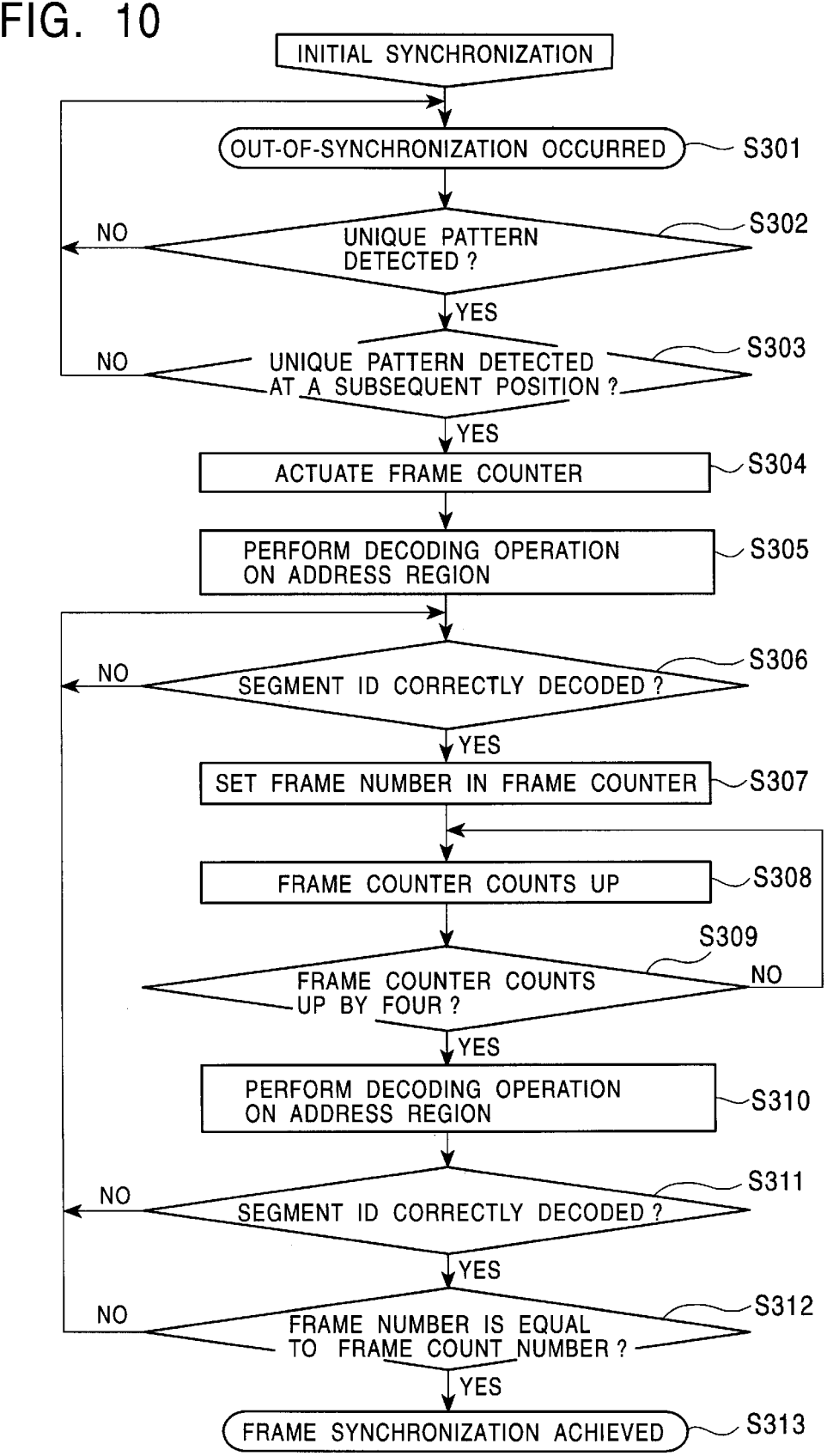
FIG. 10 is a flow chart illustrating an algorithm for establishing initial synchronization by using the embodiment shown in FIG. 9.

The initial synchronizing operation will be described with reference to the flow chart of FIG. 10. Steps S301 through S313 other than step S306 shown in the flow chart of FIG. 10 are similar to the corresponding steps of the flow chart of FIG. 6. In step S306, since it is checked whether the segment ID has been correctly decoded, the specific procedure should be preformed in accordance with the method for forming the segment ID. In this embodiment, the segment ID decoding circuit 31 divides the 12-bit code, i.e., the segment ID, into two bit strings, i.e., a first 6-bit word and a second 6-bit word. Only when the two bit strings coincide with each other is it determined that the segment ID has been accurately decoded.

Figure 11:
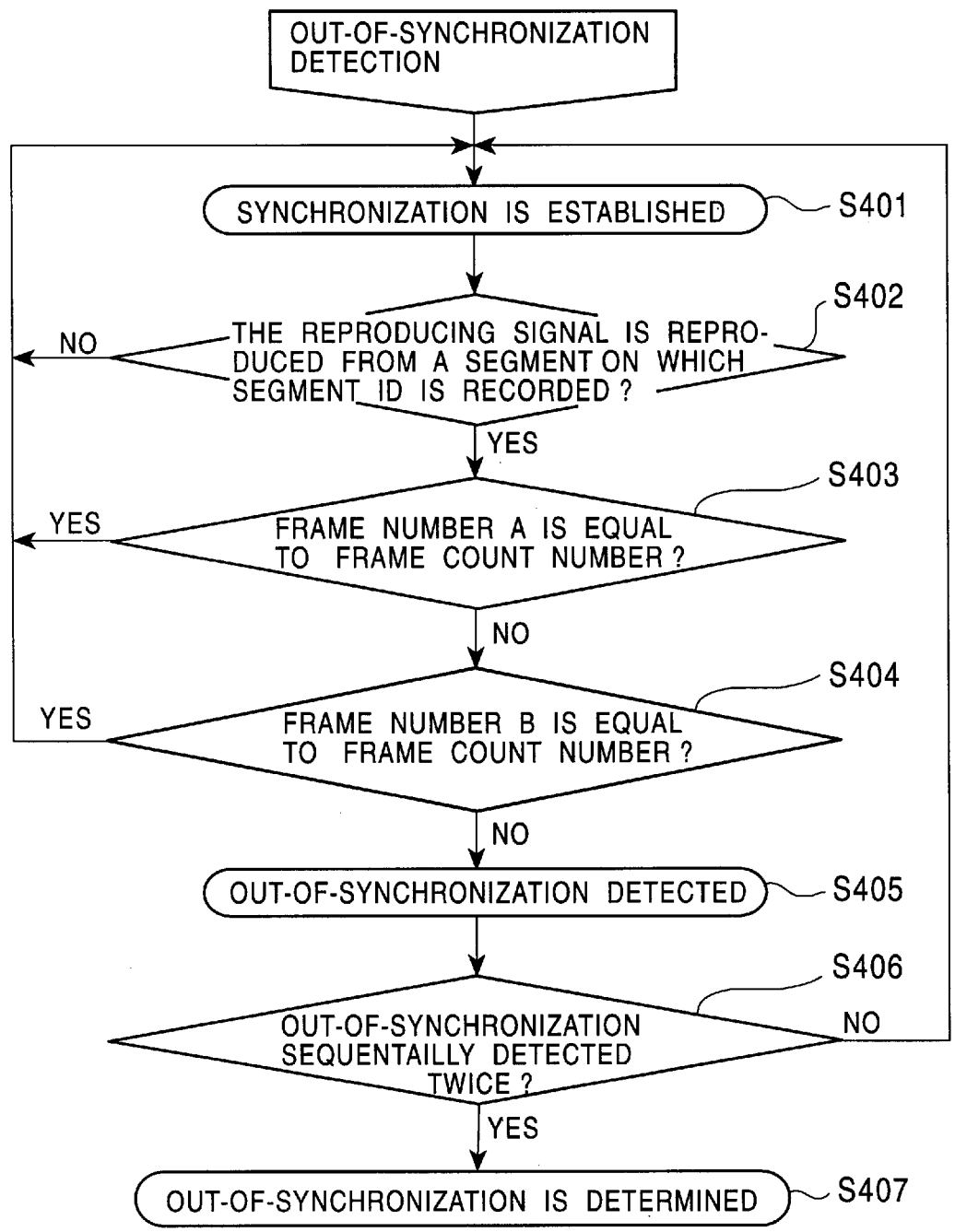
FIG. 11 is a flow chart illustrating an algorithm for detecting frame is a flow chart illustrating an algorithm for detecting frame out-of-synchronization by using the embodiment shown in FIG. 9.

The operation for detecting frame out-of-synchronization will be explained with reference to the flow chart of FIG. 11. Steps S401 through S407 illustrated in the flow chart of FIG. 11 except for steps S403 and S404 are similar to the corresponding steps shown in the flow chart of FIG. 7. In steps S403 and S404, since it is checked whether each of the decoded frame numbers is equal to the frame counter number, the specific procedure should be performed in accordance with the method for forming the segment ID.

In this embodiment, prior to steps S403 and S404, the segment ID decoding circuit 31 divides the 12-bit code into two bit strings, i.e., a first 6-bit word and a second 6-bit word. The first 6-bit word is set as a frame number A, while the second 6-bit word is set as a frame number B. The frame number A and the frame number B are supplied to the frame manager 36, which then sequentially compares them with the frame counter number. More specifically, in step S403, the frame number A is compared with the frame counter number, and in step S404, the frame number B is compared with the frame counter number.

In the foregoing embodiments, the above-described coding technique (2) or the coding technique (1) is used as the coding method for producing the segment ID. Another coding method may be employed in a magnetic disk drive according to a further embodiment of the present invention. In this embodiment, the elements other than the algorithm used in this embodiment, i.e., the configuration of the magnetic disk and the circuitry configuration of the magnetic disk drive are similar to those of the foregoing embodiments.

Figures 12, 13:
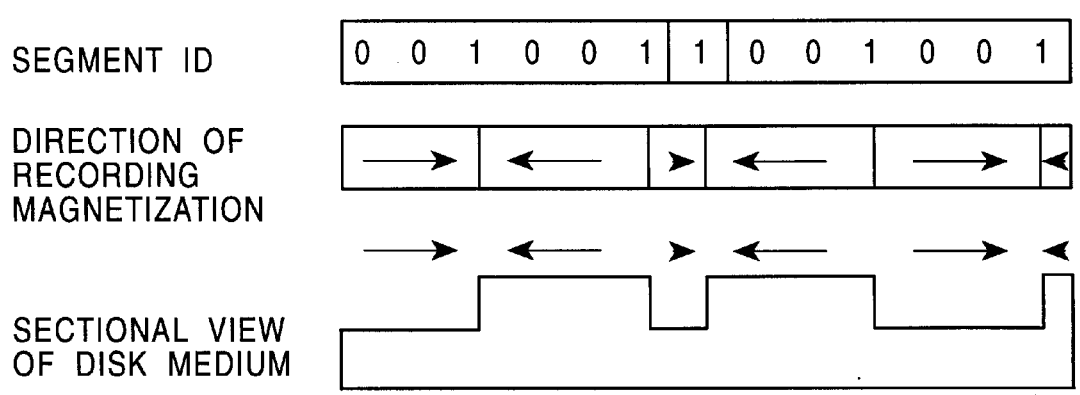
FIG. 12 schematically illustrates an example of the configuration of a segment ID usable in a further embodiment of the present invention.
FIG. 13 schematically illustrates the cross section of the segment ID of the embodiment shown in FIG. 12.

In the following explanation, the coding method used in this embodiment will be referred to as "the coding technique (3)". An example of the segment ID formed by the coding technique (3) is shown in FIG. 12. The address region has 13 bits. A 6-bit frame (segment) number is repeated, and one bit "1" or "0" intervenes between the two frame numbers. The bit "1" or "0" is used as parity for the 6-bit frame (segment) numbers. In the example shown in FIG. 12, the parity bit is "1" when an even number of "1"s are contained in the 6-bit frame (segment) number. On the other hand, the parity bit is "0" when an odd number of "1"s are contained in the 6-bit frame number.

Conversely, the parity bit may be "0" when an even number of "1"s are contained in the 6-bit frame (segment) number. On the other hand, the parity bit may be "1" when an odd number of "1"s are contained in the 6-bit frame number.

Namely, in the coding technique (3), a code is formed by repeating a plurality of information words (frame numbers) and by inserting parity information between the information words. When an odd number of "1"s are included in the information word, one bit "0" or a bit string consisting of a plurality of an even number of bits "1"s is used as the parity information. When an even number of "1"s are included in the information word, one bit "1" or a bit string consisting of a plurality of an odd number of bits "1"s is employed.

Magnetic recording (NRZI recording) is performed according to the coding technique (3) in such a manner that the bit "0" of the code represents the absence of the reversal of magnetization and that the bit "1" of the code indicates the presence of the reversal of magnetization. In this case, for example, when a segment ID is generated by forming all the embossed pits on a disk at one time, the number of projections and the number of depressions are substantially equal to each other, thereby eliminating differences between the projections and depressions of the embossed pits. This makes it possible to enhance the stability of a floating magnetic head, thereby stably obtaining reproducing signals from a disk-like information recording medium. An example of the segment ID generated in the above manner is shown in FIG. 13.

Figure 14:
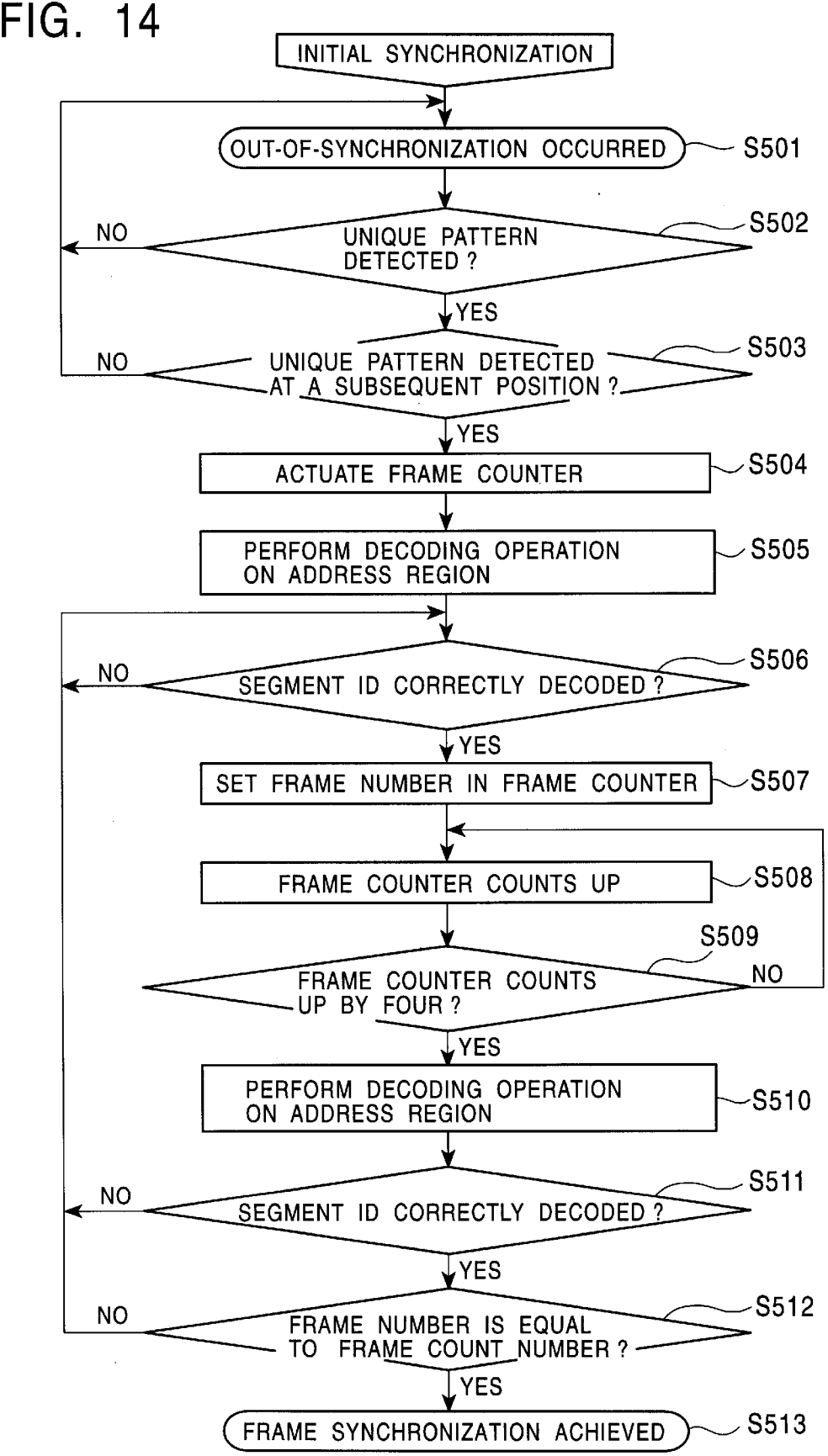
FIG. 14 is a flow chart illustrating an algorithm for establishing initial synchronization by using the embodiment shown in FIG. 12.

The initial synchronizing operation according to this embodiment of the present invention will now be described with reference to the flow chart of FIG. 14. Steps S501 through S513 other than step S506 shown in the flow chart of FIG. 14 are similar to the corresponding steps of the flow chart of FIG. 6. In step S506, since it is checked whether the segment ID has been correctly decoded, the specific procedure should be performed in accordance with the method for forming the segment ID. In this embodiment, the segment ID decoding circuit 31 extracts two bit strings, i.e., a first 6-bit word and a second 6-bit word, from the above-described 13-bit code. Only when the first 6-bit word and the second 6-bit word coincide with each other is it concluded that the segment ID has been accurately decoded.

Figure 15:
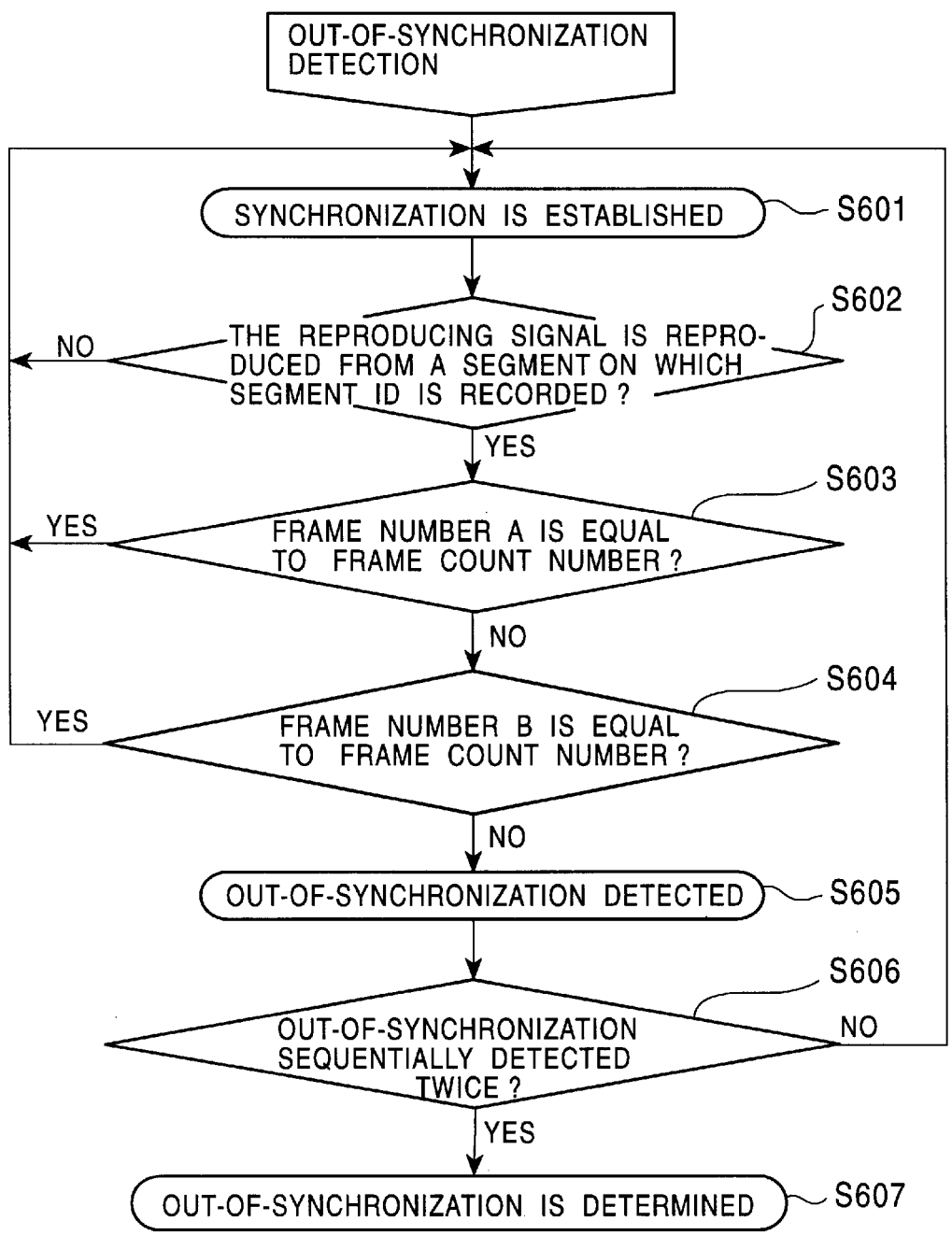
FIG. 15 is a flow chart illustrating an algorithm for detecting frame out-of-synchronization by using the embodiment shown in FIG. 12.

The operation for detecting frame out-of-synchronization of this embodiment will be described with reference to the flow chart of FIG. 15. Steps S601 through S607 other than steps S603 and S604 shown in the flow chart of FIG. 15 are similar to the corresponding steps illustrated in the flow chart of FIG. 7. In steps S603 and S604, since it is determined whether the respective decoded frame numbers match the frame counter number, the specific procedure should be performed in accordance with the method for forming the segment ID.

According to this embodiment, prior to steps S603 and S604, the segment ID decoding circuit 31 extracts two bit strings, i.e., a first 6-bit word and a second 6-bit word, from the 13-bit code. Then, the first 6-bit word is set as a frame number A, while the second 6-bit word is set as a frame number B. The frame number A and the frame number B are supplied to the frame manager 36, which then sequentially compares them with the frame counter number. Namely, in step S603, the frame number A is compared with the frame counter number, and in step S604, the frame number B is compared with the frame counter number.

According to the foregoing embodiments, the segment ID patterns, the unique patterns, and the access patterns are disposed in address regions at a ratio of 1:1:2 with a fixed period. However, arrangements other than the above pattern may be considered.

For example, if the unique pattern detector 30 has a sufficiently high capability of detecting a unique pattern, the number of unique patterns may be decreased. In this case, specific information, such as the recording surface numbers, may be patterned or recorded on an extra area, which becomes available by decreasing the number of unique patterns. Alternatively, the extra area may be used as a gap.

Moreover, if the positioning control circuit 17 is able to perform position control with a sufficiently high reliability even in a lower control sampling period, the number of access patterns may be decreased.

The segment ID patterns may be formed in an area other than the servo area, or may be formed in all the segments. Further, the segment ID pattern may be provided, for example, only for the leading segment of a sector rather than being placed with a fixed period.

In the foregoing embodiments, the present invention is applied to a magnetic disk drive using a magnetic disk having more than 100 segments. The present invention may, however, be used in a magnetic disk drive using a magnetic disk having less than 100 segments. In this case, even if segment IDs are provided for all the segments, a great amount of formatting loss does not incur.

In the foregoing embodiments, the clock marks and the unique patterns are radially and continuously formed on a recording surface of a magnetic disk. The present invention may be, however, applied to a disk-like information recording medium on which marks and patterns are only intermittently disposed along the radius of the recording medium.

Further, in the foregoing embodiments, the clock marks, the access patterns, the fine patterns, the segment IDs, and the unique patterns are formed by disposing a magnetic layer on a non-magnetic substrate having embossed pits and by magnetizing the marks and patterns. The above-described marks and patterns may be formed by another method.

For example, projections and depressions may be provided by means such as etching on a magnetic layer formed on a flat substrate, and then magnetized. Alternatively, the above-described marks and patterns may be magnetically recorded on a conventional flat recording surface.

Although in the foregoing embodiments, an ordinary recording/reproducing magnetic head is used for recording or reproducing information, heads specifically and respectively used for recording information and reproducing information may be provided. Alternatively, a reproducing head operable based on another means may be used as long as it is able to detect the foregoing patterns and marks formed on a servo area and to detect the reversal of magnetization within a data area corresponding to the recording data.

Moreover, the initial synchronizing operation and the frame out-of-synchronization detection may be performed according to an algorithm other than the algorithms used in the foregoing embodiments. An algorithm may be formed by combining the steps for performing the initial synchronizing operation and for detecting frame out-of-synchronization in a manner different from the combination of the steps used in the foregoing embodiments. More specifically, the following steps may be suitably combined to form an algorithm: the steps of: checking a predetermined number of times whether a segment ID has been correctly decoded; confirming a predetermined number of times that the frame number decoded from the segment ID is equal to the frame counter number; checking a predetermined number of times that a unique pattern has been detected; and determining a predetermined number of times that an access pattern has been detected. For example, the following algorithm for detecting frame out-of-synchronization may be used. When the decoded frame number does not coincide with the frame counter number, it is checked whether the subsequent unique patterns have been sequentially detected twice.

In the foregoing embodiments, only when all the reproduced information words completely coincide with each other is it determined that the segment ID has been correctly decoded. However, when a predetermined number of information words among the total number of the information words are equal to each other, it may be determined that the segment ID has been accurately decoded. For example, when two out of three information words coincide with each other, it may be concluded that the segment ID has been correctly decoded.

Alternatively, if a predetermined number of bits selected from a bit string forming an information word are equal to the corresponding bits of another information word, it may be determined that the segment ID has been correctly decoded. For example, when a segment ID is formed of two 6-bit information words, and if four bits of one 6-bit information word coincide with four bits of the other information word, it may be concluded that the segment ID has been accurately decoded.

Further, the present invention may be applied to disk-like information recording mediums other than magnetic disks, such as magneto-optical (MO) disks, rewritable disks, for example, phase transition-type PDs, WORM (write once, read many times) disks, for example, CD-Rs, and optical disks, such as read only disks, for example, CD-ROMs. Additionally, the present invention may be used in an information recording/reproducing apparatus using one of the above disk-like information recording mediums in which frame synchronization should be established prior to the recording/reproducing operation.

While the present invention has been described with reference to what are presently considered to be the preferred embodiments, it is to be understood that the invention is not limited to the disclosed embodiments. The present invention is intended to cover various modifications and equivalent arrangements included within the spirit and scope of the appended claims.

As is seen from the foregoing embodiment, the present invention offers the following advantages.

In this invention, a segment ID representing the position in a track direction which has been provided on a disk-like information recording medium is detected during the initial synchronizing operation. This eliminates the need for detecting a home index pattern, thereby making it possible to speedily achieve frame synchronization when initialization is performed or recording surfaces are switched.

Also, frame synchronization can be speedily established even though a disk-like recording medium and a recording/ reproducing head used in a recording/reproducing disk drive are not manufactured with very high precision.

Moreover, when the present invention is applied to an IDless format-type information recording disk drive, the recording operation performed on an incorrect data area can be promptly interrupted. Thus, it is possible to minimize the destruction of recorded data, thereby significantly improving the reliability of recorded data.

Further, in the manufacturing process of a disk-like information recording medium, if a segment ID is generated by forming all the embossed pits at one time according to the coding technique (2) or (3), the number of projections and the number of depressions are substantially equal to each other, thereby eliminating differences between the projections and depressions of the embossed pits. This makes it possible to enhance the stability of a floating magnetic head, thereby stably obtaining reproducing signals from the disk-like information recording medium.

What is claimed is:

1. A disk-like information recording medium comprising a plurality of concentrically or spirally formed tracks which are equally divided into a plurality of segments, each of said segments having a servo area for recording servo information and a data area for recording user data, said servo information having a segment ID formed by coding an information word representing a rotational angle measured from a rotational angle origin according to a predetermined coding method, wherein said segment IDs are recorded or formed within said servo areas in such a manner that they are spaced uniformly in the track direction by continuously placing a plurality of information words representing a rotational angle measured from a rotational angle origin and inserting parity information for the plurality of information words between the plurality of information words.

2. An information recording/reproducing apparatus using a disk-like information recording medium which comprises a plurality of concentrically or spirally formed tracks which are equally divided into a plurality of segments, each of said segments having a servo area for recording servo information and a data area for recording user data, said servo information having a segment ID formed by coding an information word representing a rotational angle measured from a rotational angle origin according to a predetermined coding method, said segment IDs being recorded or formed within said servo areas in such a manner that they are spaced uniformly in the track direction by continuously placing a plurality of information words representing a rotational angle measured from a rotational angle origin and inserting parity information for the plurality of information words between the plurality of information words, said information recording/reproducing apparatus comprising:

decoding means for decoding said segment ID from a reproducing signal reproduced from said disk-like information recording medium;

synchronization means for establishing frame synchronization based on a decoded value; and recording/reproducing means for performing a recording/reproducing operation based on the established frame synchronization.

3. An information recording/reproducing apparatus using a disk-like information recording medium which comprises a plurality of concentrically or spirally formed tracks which are equally divided into a plurality of segments, each of said segments having a servo area for recording servo information and a data area for recording user data, said servo information having a segment ID formed by coding an information word representing a rotational angle measured from a rotational angle origin according to a predetermined coding method, said segment IDs being recorded or formed within said servo areas in such a manner that they are spaced uniformly in the track direction, said information recording/reproducing apparatus comprising:

decoding means for decoding said segment ID from a reproducing signal reproduced from said disk-like information recording medium, said decoding means decoding said segment ID by representing the direction of magnetization on said disk-like information recording medium by an internal state of a Viterbi decoder and directly outputting the direction of magnetization; and synchronization means for establishing frame synchronization based on a decoded value; and recording/reproducing means for performing a recording/reproducing operation based on the established frame synchronization, wherein a bit '1', contained in said segment ID represents the presence of the reversal of magnetization, while a bit '0' contained in said segment ID represents the absence of the reversal of magnetization, and wherein said parity information is formed of a bit string having an even number of '1's in a case where an odd number of '1's are included in the information word, and said parity information is formed of a bit string having an odd number of '1's in a case where an even number of '1's are contained in the information word.

4. A method for establishing synchronization for use in an information recording/reproducing apparatus using a disk-like information recording medium which comprises a plurality of concentrically or spirally formed tracks which are equally divided into a plurality of segments, each of said segments having a servo area for recording servo information and a data area for recording user data, said servo information having a segment ID formed by coding an information word representing a rotational angle measured from a rotational angle origin according to a predetermined coding method, said segment IDs being recorded or formed within said servo areas in such a manner that they are spaced uniformly in the track direction, said method comprising the steps of:

establishing initial synchronization by decoding said segment ID in a case where frame synchronization has not yet been established, initial synchronization established by,
  checking as to whether said segment ID has been correctly decoded so as to obtain a correct decoded value by comparing the plurality of information words decoded from said segment ID,
  setting the decoded value in a frame counter, and
  checking as to whether a frame is locked by comparing the decoded value decoded from the subsequent segment ID with the number of the frame counter;

detecting frame out-of-synchronization by decoding said segment ID after said initial-synchronization establishing step; and performing a predetermined operation to take measures against the frame out-of-synchronization detected in said step of detecting frame out-of-synchronization.

5. A method for establishing synchronization for use in an information recording/reproducing apparatus using a disk-like information recording medium which comprises a plurality of concentrically or spirally formed tracks which are equally divided into a plurality of segments, each of said segments having a servo area for recording servo information and a data area for recording user data, said servo information having a segment ID formed by coding an information word representing a rotational angle measured from a rotational angle origin according to a predetermined coding method, said segment IDs being recorded or formed within said servo areas in such a manner that they are spaced uniformly in the track direction, said method comprising the steps of:

establishing initial synchronization by decoding said segment ID in a case where frame synchronization has not yet been established;

detecting frame out-of-synchronization by decoding said segment ID after said initial-synchronization establishing step, out-of-frame synchronization detected by, proceeding to indicate that frame out-of-synchronization has been detected only in a case where said segment IDs are decoded and each of the decoded values is compared with the number of a frame counter and, upon comparison, it is found that all of the decoded values are different from the number of the frame counter, and determining that a frame is out of synchronization only in a case where each of the decoded values is compared with the number of the frame counter and, upon comparison, it is found that all of the decoded values are different from the number of the frame counter; and performing a predetermined operation to take measures against the frame out-of-synchronization detected in said step of detecting frame out-of-synchronization.

6. A method for establishing synchronization for use in an information recording/reproducing apparatus using a disk-like information recording medium which comprises a plurality of concentrically or spirally formed tracks which are equally divided into a plurality of segments, each of said segments having a servo area for recording servo information and a data area for recording user data, said servo information having a segment ID formed by coding an information word representing a rotational angle measured from a rotational angle origin according to a predetermined coding method, said segment IDs being recorded or formed within said servo areas in such a manner that they are spaced uniformly in the track direction, said method comprising the steps of:

establishing initial synchronization by decoding said segment ID in a case where frame synchronization has not yet been established;

detecting frame out-of-synchronization by decoding said segment ID after said initial-synchronization establishing step, out-of-frame synchronization further detected by, checking as to whether said segment ID has been correctly decoded so as to obtain a correct decoded value by comparing the plurality of information words decoded from said segment ID, proceeding to take measures against the detected frame out-of-synchronization only in a case where the decoded values are compared with the number of a frame counter and, upon comparison, it is found that all of the decoded values are different from the number of the frame counter, and determining that a frame is out of synchronization only in a case where each of the decoded values is compared with the number of the frame counter and, upon comparison, it is found that all of the decoded values are different from the number of the frame counter; and performing a predetermined operation to take measures against the frame out-of-synchronization detected in said step of detecting frame out-of-synchronization.

7. A method for establishing synchronization for use in an information recording/reproducing apparatus using a disk-like information recording medium which comprises a plurality of concentrically or spirally formed tracks which are equally divided into a plurality of segments, each of said segments having a servo area for recording servo information and a data area for recording user data, said servo information having a segment ID formed by coding an information word representing a rotational angle measured from a rotational angle origin according to a predetermined coding method, said segment IDs being recorded or formed within said servo areas in such a manner that they are spaced uniformly in the track direction, said method comprising the steps of:

establishing initial synchronization by decoding said segment ID in a case where frame synchronization has not yet been established;

detecting frame out-of-synchronization by decoding said segment ID after said initial-synchronization establishing step; and performing a predetermined operation to take measures against the frame out-of-synchronization detected in said step of detecting frame out-of-synchronization, and proceeding to said initial synchronization establishing step.

8. A method for establishing frame synchronization according to claim 7, wherein said step of taking measures against frame out-of-synchronization comprises proceeding to an emergency write inhibit operation for speedily interrupting a recording operation in a case where frame out-of-synchronization has been detected during the recording operation.

* * * * *